(12) United States Patent
Koral

(10) Patent No.: US 11,653,229 B2
(45) Date of Patent: May 16, 2023

(54) CORRELATING RADIO ACCESS NETWORK MESSAGES OF AGGRESSIVE MOBILE DEVICES

(71) Applicant: AT&T Intellectual Property I, L.P., Atlanta, GA (US)

(72) Inventor: Yaron Koral, Cherry Hill, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 31 days.

(21) Appl. No.: 17/187,208

(22) Filed: Feb. 26, 2021

(65) Prior Publication Data

US 2022/0279364 A1 Sep. 1, 2022

(51) Int. Cl.
*H04W 24/02* (2009.01)
*H04W 48/02* (2009.01)
*H04W 72/04* (2009.01)

(52) U.S. Cl.
CPC .......... *H04W 24/02* (2013.01); *H04W 48/02* (2013.01); *H04W 72/0406* (2013.01)

(58) Field of Classification Search
None
See application file for complete search history.

(56) References Cited

U.S. PATENT DOCUMENTS

| | | |
|---|---|---|
| 8,255,994 B2 | 8/2012 | Upadhyay et al. |
| 9,363,278 B2 | 6/2016 | Maria |
| 9,992,212 B2 * | 6/2018 | Hearn ................. H04L 63/1425 |
| 10,397,892 B2 | 8/2019 | Vrzic et al. |
| 2006/0276173 A1 | 12/2006 | Srey et al. |
| 2014/0274019 A1 | 9/2014 | Batchu et al. |
| 2016/0277926 A1 | 9/2016 | Molina et al. |
| 2016/0282394 A1 | 9/2016 | House et al. |
| 2016/0373467 A1 | 12/2016 | Thyni et al. |
| 2018/0007084 A1 | 1/2018 | Reddy et al. |
| 2018/0027437 A1 * | 1/2018 | Vitthaladevuni ... H04W 52/343 370/252 |

(Continued)

OTHER PUBLICATIONS

Non Final Office Action issued for U.S. Appl. No. 16/847,031 dated Jun. 3, 2022, 23 pages.

(Continued)

*Primary Examiner* — Hong S Cho

(74) *Attorney, Agent, or Firm* — Amin, Turocy & Watson, LLP

(57) ABSTRACT

Excessive signaling by devices against a radio access network (RAN) can be detected and mitigated. A security management component (SMC) can determine whether a total number of control signals received by a base station from devices satisfies a threshold total number of control signals indicative of excessive signaling. If so, SMC can identify a device associated with the base station based on analyzing communication conditions associated with the device. SMC can determine whether to classify the device as an excessive signaling device based on whether the number of control signals received from the device by the base station satisfies a threshold number of control signals indicative of excessive signaling. If so, SMC can determine the device is an excessive signaling device. In response, SMC can perform or facilitate performing a mitigation action to mitigate excessive signaling or can generate statistics relating to the excessive signaling.

20 Claims, 13 Drawing Sheets

(56) References Cited

U.S. PATENT DOCUMENTS

| | | |
|---|---|---|
| 2019/0028493 A1 | 1/2019 | Endo et al. |
| 2020/0021994 A1 | 1/2020 | Ranjbar et al. |
| 2020/0195673 A1 | 6/2020 | Lee |
| 2020/0320106 A1 | 10/2020 | Goldfarb |
| 2021/0144555 A1 | 5/2021 | Kim et al. |
| 2021/0306372 A1 | 9/2021 | Koral et al. |
| 2021/0321259 A1 | 10/2021 | Louafi et al. |
| 2022/0038157 A1 | 2/2022 | Ali et al. |
| 2022/0086636 A1 | 3/2022 | Trakinat et al. |
| 2022/0104114 A1 | 3/2022 | Garcia Martin |
| 2022/0131966 A1* | 4/2022 | Cai ................... H04L 63/1425 |
| 2022/0207352 A1 | 6/2022 | Barr et al. |
| 2022/0247786 A1 | 8/2022 | Vavilala et al. |
| 2022/0248296 A1 | 8/2022 | Merwaday et al. |

OTHER PUBLICATIONS

Notice of Allowance issued for U.S. Appl. No. 16/847,031 dated Oct. 12, 2022, 25 pages.

Non Final Office Action issued for U.S. Appl. No. 17/202,999 dated Sep. 15, 2022, 35 pages.

Non Final Office Action received for U.S. Appl. No. 17/475,069 dated Jan. 6, 2023, 73 pages.

Notice of Allowance received for U.S. Appl. No. 17/202,999 dated Jan. 11, 2023, 25 pages.

* cited by examiner

CORRELATING RADIO ACCESS NETWORK MESSAGES OF AGGRESSIVE MOBILE DEVICES

TECHNICAL FIELD

This disclosure relates generally to electronic communications, e.g., to correlating radio access network messages of aggressive mobile devices.

BACKGROUND

Communication devices can communicate data to other communication devices via a communication network. For example, a wireless device (e.g., mobile, cell, or smart phone; electronic tablet or pad; Internet of Things (IoT) device; or other type of wireless device) can connect to and communicate with a wireless communication network (e.g., core network), via a base station associated with the wireless communication network, to communicate with another communication device connected to the wireless communication network or to another communication network (e.g., Internet Protocol (IP)-based network, such as the Internet) associated with (e.g., communicatively connected to) the wireless communication network. The wireless device can, for instance, communicate information to a base station and associated wireless communication network (e.g., core network) via an uplink and can receive information from the base station (and associated wireless communication network) via a downlink.

The above-described description is merely intended to provide a contextual overview regarding electronic communications, and is not intended to be exhaustive.

DETAILED DESCRIPTION

Figure 1:
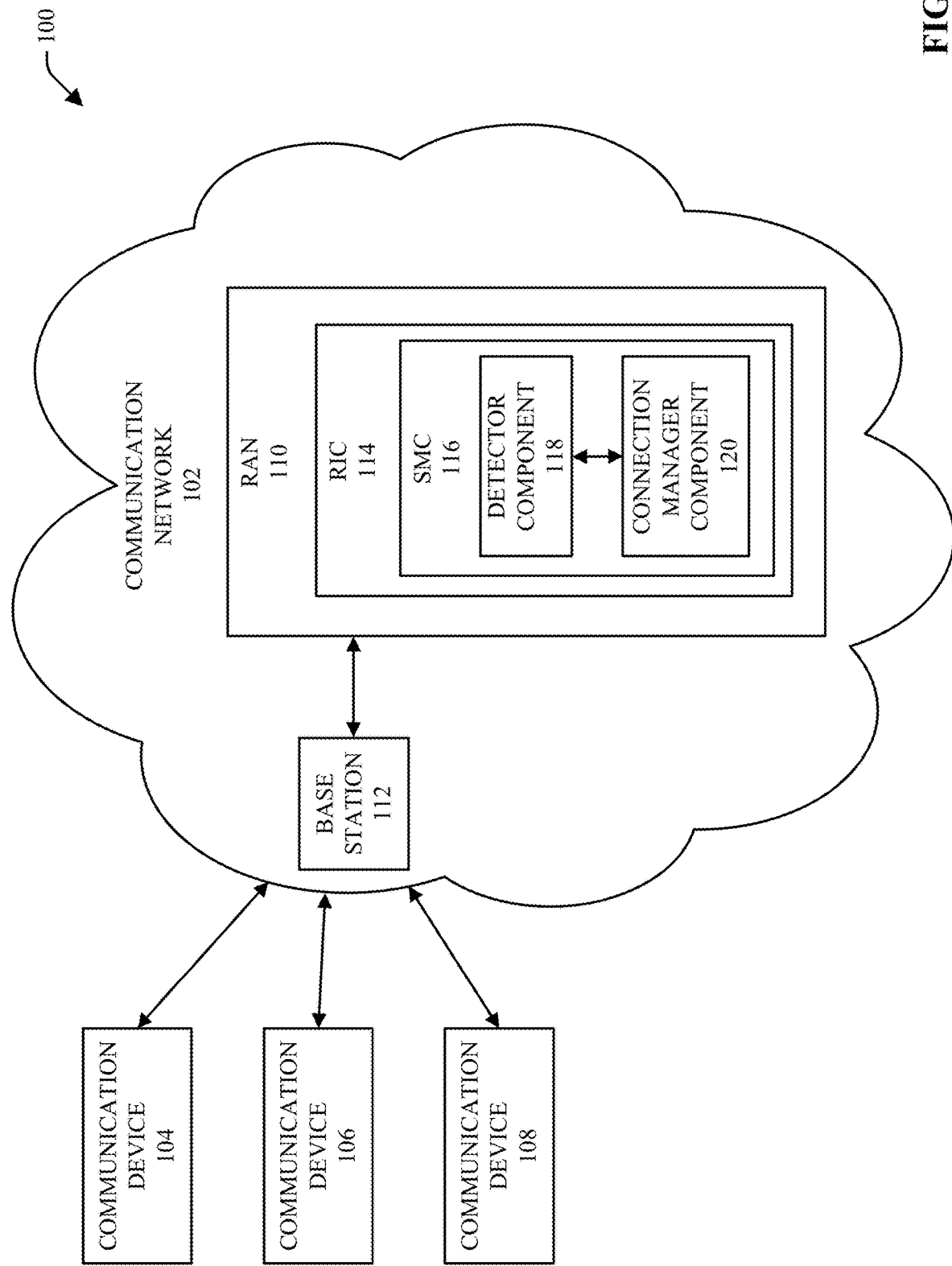
FIG. 1 illustrates a block diagram of an example system that can desirably manage communication connections of communication devices to a communication network, including detecting and mitigating excessive signaling and/or malicious events by communication devices against a radio access network (RAN), while allowing other communication devices to connect and communicate via the RAN, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Discussed herein are various aspects that relate to detecting and mitigating aggressive (e.g., excessive) signaling and/or malicious events, such as, for example, distributed denial of service (DDoS) attacks (also referred to herein as signaling storms), against a communication network (e.g., wireless communication network) using machine learning techniques and algorithms, and, when aggressive signaling and/or malicious event is detected, determining a desired action(s), which can include a mitigation action, to perform to mitigate the aggressive signaling and/or malicious event, present an alert regarding the aggressive signaling and/or malicious event, and/or to learn more information regarding the aggressive signaling and/or malicious event. The disclosed subject matter can enhance detection and mitigation of aggressive signaling and/or malicious events against the communication network, enable critical communications and/or benign communications to be communicated via the communication network without disruption, enhance the user experience with regard to communications via the communication network, enhance security of the communication network, and enhance network efficiency of the communication network.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 2G, 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/HSPA, Global System for Mobile Communications (GSM)/GSM EDGE Radio Access Network (GERAN), Wi Fi, Wireless Local Area Network (WLAN), WiMax, CDMA2000, and so on).

As used herein, "5G" can also be referred to as New Radio (NR) access. Accordingly, systems, methods, and/or machine-readable storage media for reducing interference on reference signals from other co-channel reference signals, and improving the channel estimation performance for CSI estimation and data detection, in 5G systems, and other next generation systems, can be desired. As used herein, one or more aspects of a 5G network can comprise, but is not limited to, data rates of several tens of megabits per second (Mbps) supported for tens of thousands of users; at least one gigabit per second (Gbps) that can be offered simultaneously to tens of users (e.g., tens of workers on the same office floor); several hundreds of thousands of simultaneous connections supported for massive sensor deployments; spectral efficiency that can be significantly enhanced compared to 4G; improvement in coverage relative to 4G; signaling efficiency that can be enhanced compared to 4G; and/or latency that can be significantly reduced compared to LTE.

Multiple Input, Multiple Output (MIMO) technology can be employed in communication networks, wherein MIMO technology can be an advanced antenna technique utilized to improve spectral efficiency and, thereby, boost overall system capacity. Spectral efficiency (also referred to as spectrum efficiency or bandwidth efficiency) refers to an information rate that can be transmitted over a given bandwidth in a communication system.

For MIMO, a notation (M×N) can be utilized to represent the MIMO configuration in terms of a number of transmit antennas (M) and a number of receive antennas (N) on one end of the transmission system. Examples of MIMO configurations used for various technologies can include: (2×1), (1×2), (2×2), (4×2), (8×2) and (2×4), (4×4), (8×4). The configurations represented by (2×1) and (1×2) can be special cases of MIMO known as transmit and receive diversity.

In some cases, MIMO systems can significantly increase the data carrying capacity of wireless communications systems. Further, MIMO can be used for achieving diversity gain, which refers to an increase in signal-to-interference ratio due to a diversity scheme and, thus, can represent how much the transmission power can be reduced when the diversity scheme is introduced, without a corresponding performance loss. MIMO also can be used to achieve spatial multiplexing gain, which can be realized when a communications system is transmitting different streams of data from the same radio resource in separate spatial dimensions (e.g., data is sent/received over multiple channels, linked to different pilot frequencies, over multiple antennas). Spatial multiplexing gain can result in capacity gain without the need for additional power or bandwidth. In addition, MIMO can be utilized to realize beamforming gain. Due to the benefits achieved, MIMO can be an integral part of the third generation wireless system and the fourth generation wireless system. In addition, 5G systems also will employ massive MIMO systems (e.g., hundreds of antennas at the transmitter side and receiver side). Typically, with a ($N_t$, $N_r$), where $N_t$ denotes the number of transmit antennas and $N_r$ denotes the number of receive antennas, the peak data rate can multiply with a factor of $N_t$ over single antenna systems in a rich scattering environment.

Communication devices can communicate information (e.g., voice and/or data traffic) to other communication devices via a communication network, which can comprise a core network that can operate to enable wireless communication between communication devices. For example, a wireless communication device (e.g., mobile, cell, or smart phone; electronic tablet or pad; computer; . . . ) can connect to and communicate with a wireless communication network (e.g., core network) to communicate with another communication device connected to the wireless communication network or to another communication network (e.g., Internet Protocol (IP)-based network, such as the Internet) associated with (e.g., communicatively connected to) the wireless communication network.

Communication devices can operate and communicate via wireless or wireline communication connections (e.g., communication links or channels) in a communication network to perform desired transfers of data (e.g., voice and/or data communications), utilize services, engage in transactions or other interactions, and/or perform other operations. In addition to wireless phones, electronic pads or tablets, and computers being used and connected to the communication network, increasingly Internet of Things (IoT) devices are being used and connected to the communication network. The number of IoT devices being employed is expected to increase exponentially into the tens of billions of IoT devices, which has been referred to as massive IoT. Massive IoT can be one of the key service drivers for 5G and other next generation communication networks.

Many IoT devices can have security vulnerabilities, such as Zero Day vulnerabilities, such as security holes in the software of the IoT devices that can be unknown to the vendor and can be exploited by malicious users (e.g., hackers or criminals). Malicious users can exploit such vulnerabilities in IoT devices, for example, to create botnet armies by infecting IoT devices with stealthy malware (e.g., by surreptitiously installing stealthy malware on IoT devices). This security threat can be expected to increase in magnitude due to the "massive" factor in massive IoT.

One of the main goals of these botnet armies of infected IoT devices can be to disrupt communication services, including mission critical 5G and other next generation services, of a communication network by means of DDoS attacks, which also are known as signaling storms. Since 5G and other next generation communication networks will facilitate massive IoT accessing the 5G and other next generation radio access network (RAN), this can increase the risk of RAN resource (e.g., 5G or other next generation RAN resource) overload by means of DDoS attacks disrupting services, including mission critical 5G and other next generation services, of the communication network.

Core networks (e.g., mobility network) today have no protection against DDoS attacks originated from devices that are connected to the network. Currently, this is not expected to change with 5G networks. Yet, 5G networks can be expected to support a significantly larger number of devices, including massive IoT. Therefore, the threat landscape posed by attacks originated by devices toward their network can be expected to grow significantly over the coming years.

By design, a RAN is not supposed to reveal subscriber identifiers of communication devices. In part, subscriber identifiers are not revealed by the RAN because it is assumed that the radio interface can be more exposed to eavesdropping, and antenna sites may be physically accessed. For this reason, temporal random identifiers can be used as a reference to communication devices (e.g., mobile or wireless communication devices). This situation can pose a problem when trying to distinguish misbehaving or malicious devices from benign devices at the RAN level. Distinguishing between malicious (or at least aggressive) and benign devices can be desirable for mitigating DDoS attacks at the RAN. Not knowing which device is malicious (or at least aggressive) or benign can leave an undesired option of blocking both malicious (or aggressive) and benign, which in itself can be a form of DDoS. Traditional mitigation mechanisms can be blind to the identity of a device, including malicious or aggressive devices. Some traditional mitigation mechanisms can block all communication devices, including benign (e.g., non-malicious) communication devices, associated with a base station, if a threshold attach rate is breached. This can undesirably deny communication services to benign communication devices.

To that end, techniques for managing communication connections of communication devices to a communication network (e.g., core network), including detecting and mitigating excessive signaling (e.g., aggressive signaling) and/or malicious events (e.g., malicious attacks) by communication devices (e.g., aggressive or malicious communication devices) against a RAN, while allowing other communication devices (e.g., non-aggressive and/or non-malicious communication devices) to connect and communicate via the RAN, are presented. This disclosed subject matter can provide techniques that can protect a core network from aggressive or malicious devices and can apply such protection in the edge of the core network, which can thereby save resources of the core network from being used unnecessarily and can preserve those resources for use in other parts of the core network.

The disclosed subject matter can comprise a security management component (SMC) that can employ a detector component that can detect excessive signaling and/or malicious events by communication devices associated with base stations (e.g., base station or one or more associated cells) of one or more RANs. In some embodiments, the SMC can be part of or associated with a RAN (e.g., the SMC can be part of a RAN intelligent controller (RIC) of the RAN). The detector component can determine whether a total number of control signals received by a base station from communication devices associated with the base station during a defined time period satisfies (e.g., breaches, or meets or exceeds) a defined threshold total number of control signals that can be indicative of excessive signaling, based at least in part on the results of analyzing activity (e.g., communication of signals, such as control signals) associated with the base station and communication devices. Control signals can comprise, for example, an attach request signal to request an attachment to the base station (e.g., an initial attach request or an update attach request), a connection request signal to request a connection to the base station, a handover-related signal associated with a handover of a communication device to or from the base station, or another type of control signal.

In response to determining that the total number of control signals received during the defined time period satisfies the defined threshold total number of control signals, the detector component can determine that there can be, or at least potentially can be, one or more communication devices that are engaging in excessive signaling against the base station. In further response, the detector component can identify one or more communication devices associated with the base station based at least in part on the results of analyzing information relating to respective communication conditions associated with respective communication devices associated with (e.g., connected to) the base station. The detector component can determine that a set of signaling can be attributed to a certain communication device (e.g., an aggressive or excessive signaling, and/or malicious acting, communication device) by analyzing the signal characteristics associated with the communication device in relation to (e.g., in contrast to) the signal characteristics of other communication devices. For instance, the detector component can identify measurements of communication conditions that can identify (e.g., be a communication signature of) a communication device, wherein, for example, multiple same or similar measurements of communication conditions can indicate that such communication conditions are associated with the same communication device. The communication conditions associated with a communication device can comprise, for example, a received signal strength indicator (RSSI), a received signal received power (RSRP), a received signal received quality (RSRQ), a channel quality indicator (CQI), a signal to interference and noise ratio (SINR), and/or a timing advance (TA) associated with the communication device. By identifying the respective signal characteristics (e.g., respective communication signatures) of the respective communication devices, the detector component can correlate signals or messages associated with different temporary identifiers and can attribute all of those signals or messages to a single communication device (e.g., an aggressive or excessive signaling, and/or malicious acting, communication device), even though such signals or messages are associated with different temporary identifiers.

In some embodiments, in addition to analyzing communication conditions associated with communication devices, the detector component can analyze configuration parameters and/or other information associated with communication devices to facilitate identifying communication devices. The configuration parameters associated with a communication device can comprise, for example, a quality of service class identifier (QCI), allocation and retention priority (ARP) parameter, a mobility management entity or access management function (MME/AMF) code, a MME/AMF group identifier, or a band frequency associated with the communication device.

The detector component can evaluate one or more communication devices (e.g., identified communication devices), and, for each communication device, can determine whether to classify the communication device as an excessive signaling device based at least in part on whether the number of control signals received from the communication device by the base station during the defined time period satisfies a defined threshold number of control signals that can be indicative of excessive signaling by the communication device. If the detector component determines that the communication device satisfies the defined threshold number of control signals, the detector component can determine that the communication device is an excessive signaling device.

In some embodiments, in response to determining a communication device(s) is an excessive signaling communication device(s), the detector component can determine and generate a set of statistics relating to the excessive signaling and excessive signaling communication device(s). The detector component can present the set of statistics to another component of the SMC, a communication device, an interface component (e.g., display screen, audio speakers, or other interface), and/or a user. In other embodiments, additionally or alternatively, in response to determining a communication device(s) is an excessive signaling communication device(s), the SMC can perform or facilitate performing a mitigation action (e.g., blocking or disconnecting an excessive signaling communication device from the base station) to mitigate (e.g., eliminate or reduce) excessive signaling by the communication device(s) identified as excessive signaling communication device(s).

These and other aspects and embodiments of the disclosed subject matter will now be described with respect to the drawings. It is to be appreciated and understood that, while various aspects and embodiments of the disclosed subject matter are described herein with regard to 5G and other next generation communication networks, the techniques of the disclosed subject matter described herein can be utilized (e.g., applied to), in same or similar form, to 4G communication networks, and the disclosed subject matter includes all such aspects and embodiments relating to implementation of the techniques of the disclosed subject matter to 4G communication networks.

Referring now to the drawings, FIG. 1 illustrates a block diagram of an example system 100 that can desirably manage communication connections of communication devices to a communication network (e.g., core network), including detecting and mitigating excessive signaling (e.g., aggressive signaling) and/or malicious events (e.g., malicious attacks) by communication devices (e.g., aggressive or malicious communication devices) against a radio access network (RAN), while allowing other communication devices (e.g., non-aggressive and/or non-malicious communication devices) to connect and communicate via the RAN, in accordance with various aspects and embodiments of the disclosed subject matter. The system 100 can comprise a communication network 102 can comprise a mobility core network (e.g., a wireless communication network). In some embodiments, the communication network can comprise or be associated with a packet data network (e.g., an Internet Protocol (IP)-based network, such as the Internet and/or intranet) that can be associated with the mobility core network.

The communication network 102 (e.g., the mobility core network of the communication network 102) can operate to enable wireless communication between communication devices and/or between a communication device and the communication network 102. The communication network 102 can comprise various components, such as network (NW) nodes (e.g., radio network nodes), that can be part of the communication network 102 to facilitate communication of information between devices (e.g., communication devices) that can be associated with (e.g., communicatively connected to) the communication network 102. In some embodiments, the communication network 102 can employ MIMO technology to facilitate data communications between devices (e.g., network devices, communication devices, or other type of device) associated with the communication network 102.

As used herein, the terms "network node," "network node component," and "network component" can be interchangeable with (or include) a network, a network controller, or any number of other network components. Further, as utilized herein, the non-limiting term radio network node, or network node can be used herein to refer to any type of network node serving communications devices and/or connected to other network nodes, network elements, or another network node from which the communications devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes also can comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Network nodes can be, for example, Node B devices, base station (BS) devices, access point (AP) devices, TRPs, and radio access network (RAN) devices. Other examples of network nodes can include multi-standard radio (MSR) nodes, comprising: an MSR BS, a gNodeB, an eNodeB, a network controller, a radio network controller (RNC), a base station controller (BSC), a relay, a donor node controlling relay, a BTS, an AP, a transmission point, a transmission node, a Remote Radio Unit (RRU), a Remote Radio Head (RRH), nodes in distributed antenna system (DAS), and the like. In accordance with various embodiments, a network node can be, can comprise, or can be associated with (e.g., communicatively connected to) a network device of the communication network 102.

At given times, one or more communication devices, such as, for example, communication device 104, communication device 106, and communication device 108, can connect or attempt to connect to the communication network 102 to communicate with other communication devices associated with the communication network 102. A communication device (e.g., 104, 106, or 108) also can be referred to as, for example, a device, a mobile device, or a mobile communication device. The term communication device can be interchangeable with (or include) a UE or other terminology. A communication device (or UE or device) can refer to any type of wireless device that can communicate with a radio network node in a cellular or mobile communication system. Examples of communication devices can include, but are not limited to, a device to device (D2D) UE, a machine type UE or a UE capable of machine to machine (M2M) communication, a Personal Digital Assistant (PDA), a tablet or pad (e.g., an electronic tablet or pad), an electronic notebook, a mobile terminal, a cellular and/or smart phone, a computer (e.g., a laptop embedded equipment (LEE), a laptop mounted equipment (LME), or other type of computer), a smart meter (e.g., a smart utility meter), a target device, devices and/or sensors that can monitor or sense conditions (e.g., health-related devices or sensors, such as heart monitors, blood pressure monitors, blood sugar monitors, health emergency detection and/or notification devices, or other type of health-related device or sensor), a broadband communication device (e.g., a wireless, mobile, and/or residential broadband communication device, transceiver, gateway, and/or router), a dongle (e.g., a Universal Serial Bus (USB) dongle), an electronic gaming device, electronic eyeglasses, headwear, or bodywear (e.g., electronic or smart eyeglasses, headwear (e.g., augmented reality (AR) or virtual reality (VR) headset), or bodywear (e.g., electronic or smart watch) having wireless communication functionality), a music or media player, speakers (e.g., powered speakers having wireless communication functionality), an appliance (e.g., a toaster, a coffee maker, a refrigerator, an oven, or other type of appliance having wireless communication functionality), a set-top box, an IP television (IPTV), a device associated or integrated with a vehicle (e.g., automobile, airplane, bus, train, ship, or other type of vehicle), a virtual assistant (VA) device, a drone, a home or building automation device (e.g., security device, climate control device, lighting control device, or other type of home or building automation device), an industrial or manufacturing related device, a farming or livestock ranch related device, and/or any other type of communication devices (e.g., other types of IoTs).

It is noted that the various aspects of the disclosed subject matter described herein can be applicable to single carrier as well as to multicarrier (MC) or carrier aggregation (CA) operation of the communication device. The term carrier aggregation (CA) also can be referred to (e.g., interchangeably called) "multi-carrier system," "multi-cell operation," "multi-carrier operation," "multi-carrier" transmission and/or reception. In addition, the various aspects discussed can be applied for Multi RAB (radio bearers) on some carriers (e.g., data plus speech can be simultaneously scheduled).

It is to be appreciated and understood that the terms element (e.g., element in connection with an antenna), elements, and antenna ports also can be used interchangeably, but can carry the same meaning, in this subject disclosure. In some embodiments, more than a single antenna element can be mapped to a single antenna port.

As disclosed, communication network 102 (e.g., the mobility core network of the communication network 102) can comprise various network components or devices, which can include one or more RANs, such as, for example, RAN 110, wherein each RAN can comprise or be associated with a set of base stations (e.g., access points (APs), such as base station 112, that can serve communication devices located in respective coverage areas served by respective base stations in the mobility core network of the communication network 102. The respective base stations (e.g., base station 112) can be associated with one or more sectors (not shown), wherein respective sectors can comprise one or more respective cells. The one or more cells can have respective coverage areas that can form the coverage area covered by the one or more sectors. The respective communication devices can be communicatively connected to the communication network 102 via respective wireless or wireline communication connections with one or more of the respective cells.

In some embodiments, the one or more RANs (e.g., RAN 110) can be an open-RAN (O-RAN) that can employ an open interface that can support interoperability of devices (e.g., network devices) from different entities (e.g., vendors). The O-RAN can build or establish wireless connections through virtualization. In certain embodiments, the O-RAN can utilize a common platform that can reduce reliance on proprietary platforms of service providers. The O-RAN also can employ standardized interfaces and application programming interfaces (APIs) to facilitate open source implementation of the O-RAN.

The number of communication devices, particularly IoT devices, being utilized is increasing at a significant rate and can be expected to continue to increase significantly into the future (e.g., increase to tens of billions of devices). While in most instances, the communication devices (e.g., 104, 106, or 108) and associated users can be attempting to connect to the RAN 110 for appropriate or benign reasons, in some instances, aggressive and/or malicious actors can utilize communication devices to attempt to connect to the RAN 110 to disrupt (e.g., obstruct or interrupt) services, such as mobility services, provided by the communication network 102, including the RAN 110. For example, malicious actors can utilize communication devices (e.g., 104 or 106), such as IoT devices, and exploit vulnerabilities of such devices (e.g., by installing malware on such communication devices) to initiate a malicious event, such as a DDoS attack, against the RAN 110 to overwhelm the RAN 110 (e.g., base station 112 and/or RAN 110) and disrupt the services provided by the RAN 110 and/or associated communication network 102, including disrupting communication between communication devices (e.g., non-malicious acting communication devices) connected to or attempting to connect to the RAN 110 and/or associated communication network 102, as more fully described herein. The disclosed subject matter can determine (e.g., intelligently, automatically, and/or dynamically) determine when aggressive signaling and/or malicious events against the base station 112 and associated RAN 110 by certain (e.g., aggressive, malicious, and/or malware infected) communication devices is occurring (e.g., in real time or substantially in real time), as more fully described herein.

In some cases, there can be communication devices that are attempting to connect to the RAN 110 to communicate benign messages and/or to communicate priority (e.g., high priority or critical) messages, via the RAN 110, to other communication devices associated with the communication network 102. If there is aggressive communication (e.g., aggressive or excessive signaling) and/or a malicious event against the RAN 110, the aggressive communication and/or malicious event, if not mitigated, can disrupt services of the RAN 110 to prevent a communication device attempting to connect and communicate benign or priority message via the RAN 110, and/or, if all communication devices attempting to connect to the RAN 110 during an aggressive communication and/or malicious event were to be blocked from connecting, that can undesirably (e.g., negatively) impact the ability of benign (e.g., non-aggressive or otherwise appropriately acting) communication devices that are attempting to connect to the RAN 110 to communicate benign or priority messages from doing so. The disclosed subject matter can desirably (e.g., intelligently, automatically, and/or dynamically in real time or substantially in real time) manage communication connections of communication devices to the RAN 110 (e.g., base station 112 and/or RAN 110) and the communication network 102 (e.g., core network), including detecting and mitigating excessive signaling (e.g., aggressive signaling) and/or malicious events (e.g., malicious attacks) by communication devices (e.g., aggressive or malicious communication devices) against the RAN 110, while allowing other communication devices (e.g., non-aggressive and/or non-malicious communication devices) to connect (or remain connected) and communicate via the base station 112 and/or RAN 110.

To that end, in some embodiments, the RAN 110 can comprise a RAN intelligent controller (RIC) 114 that can manage various functions and resources of or associated with the RAN 110 in real time or substantially close (e.g., near) to real time. In some embodiments, the RIC 114 can be part of an O-RAN (e.g., part of an overall architecture of the O-RAN). To facilitate securing the RAN 110 and communication network 102 overall from aggressive and/or malicious communication devices and/or malicious events (e.g., malicious attacks, such as DDoS attacks), the RIC 114 can comprise a security management component (SMC) 116 that can detect and mitigate malicious events against the RAN 110 and can manage connection of communication devices (e.g., 104, 106, or 108) to the RAN 110 (e.g., manage connection of communication devices during aggressive signaling and/or malicious events), in accordance with defined communication management criteria, which can comprise defined network security criteria. In some embodiments, the SMC 116 can employ a security application (e.g., malicious event and/or DDoS application) to facilitate detecting and mitigating aggressive signaling and/or malicious events against the RAN 110, and managing (e.g., controlling) connections of communication devices to the RAN 110. For example, the security application can be a micro services application (e.g., xApp). In that regard, for instance, as part of the capabilities of the RIC 114, micro services applications (e.g., xApps) can be written or implemented on top of the RIC 114, and the SMC 116 can be or can comprise the security application that can be a micro services application (e.g., xApp) that can be implemented on top of the RIC 114.

Communication devices (e.g., 104, 106, or 108) can communicate attach requests or other types of communications (e.g., other types of signals, such as control signals) to the base station 112 and associated RAN 110 to facilitate obtaining services or resources from the base station 112 and associated RAN 110. For instance, a communication device (e.g., communication device 104) can communicate an initial attach request to the RAN 110 to request connection to the RAN 110, can communicate another type of attach request (e.g., update request, such as an authentication update request, a packet data network (PDN) gateway (PGW) update request, or other type of update request) to the RAN 110 to request another type of service or resources from the RAN 110, can communicate a connection request signal to the RAN 110 to request a connection to the base station (e.g., base station 112), can communicate a handover-related signal associated with a handover of a communication device to or from the base station (e.g., base station 112), or can communicate another type of control signal to the base station (e.g., base station 112) and RAN 110.

When communication devices (e.g., 104, 106, or 108) communicate control signals (e.g., attach requests or other types of control signals) to the RAN 110, the SMC 116 can receive information comprising or relating to such control signals. The RAN 110 and the SMC 116 can receive the information contained in the control signal (e.g., in an attach request or other type of control signal) from the communication device (e.g., communication device 104) and/or can receive other information (e.g., other control signal-related information) from the communication device or network devices of the communication network 102. For instance, the RAN 110 can receive device identifier information (e.g., international mobile equipment identity (IMEI) number, international mobile subscriber identity (IMSI) number, or other unique device identifier or serial number) that can identify the communication device, device location information that can identify the location of the communication device, device type information that can identify the type of device the communication device is, priority information that can indicate or specify a priority level associated with the communication device or message associated with the communication device, time data (e.g., time stamp data) that can indicate the time of the attach request or type of communication or time(s) associated with another item(s) of attach request-related information, metadata associated with the attach request and/or communication device, and/or other type of control signal-related information.

It is noted that, with regard to the device identifier information (e.g., IMEI, IMSI), while the RAN 110 can receive the device identifiers (e.g., IMEI, IMSI), the device identifiers are not revealed to the RAN 110, because the network is not supposed to reveal device or subscriber identifiers of communication devices in part because it is assumed that the radio interface can be more exposed to or compromised by eavesdropping, and antenna sites potentially can be physically accessed. For this reason, the RAN (e.g., RAN 110) and other network components can utilize temporal (e.g., temporary) random identifiers as a reference to communication devices (e.g., mobile or wireless communication devices) and/or associated subscribers. Examples of temporal random identifiers can comprise cell radio network temporary identifier (C-RNTI) and temporary mobile subscriber identity (TMSI). A C-RNTI can be a temporary unique identifier that can be used, instead of the IMEI, for example, for identifying the RRC connection and scheduling that can be dedicated to a communication device. A TMSI can be a temporary unique identifier that can be used, instead of the IMSI, to ensure or maintain the privacy of the subscriber associated with a communication device.

Figure 2:
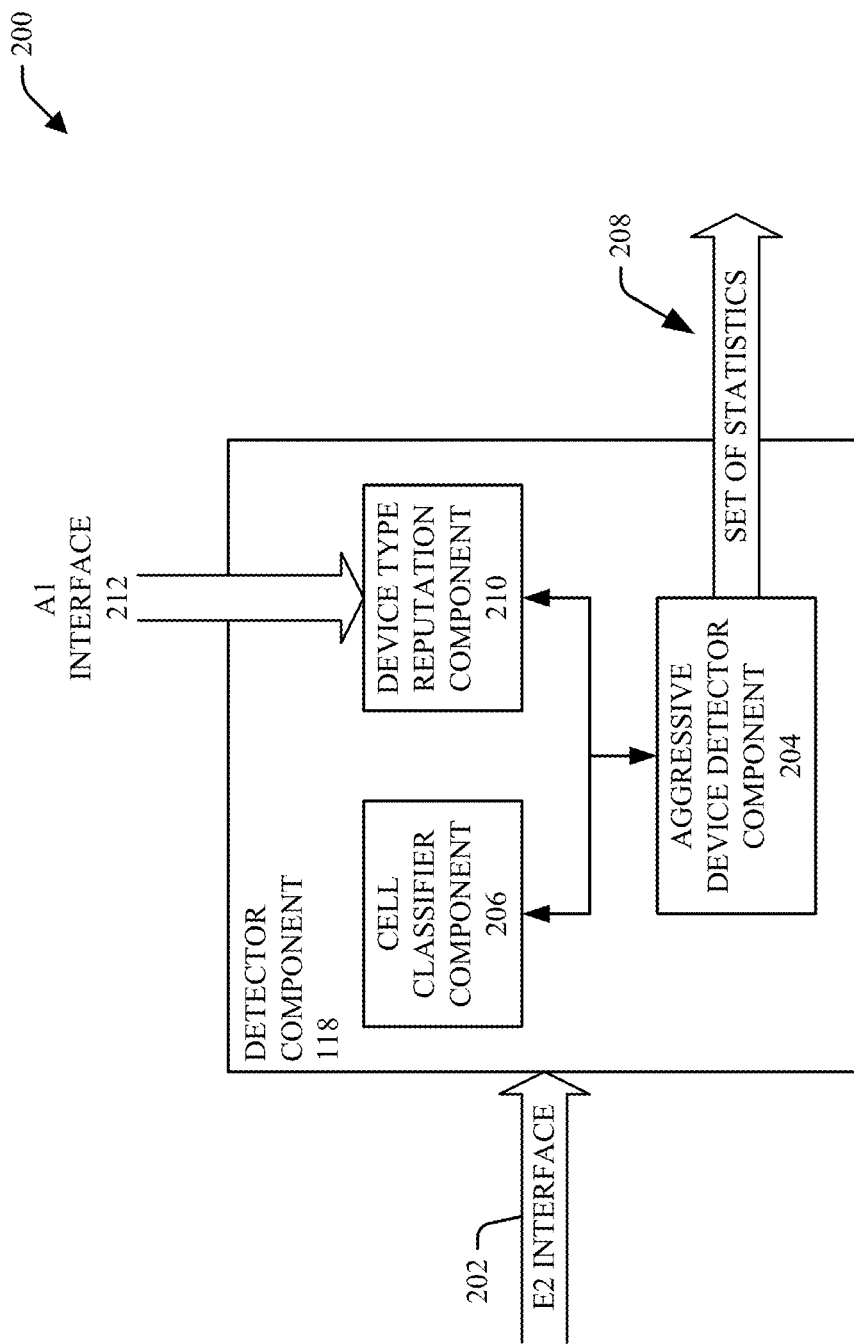
FIG. 2 depicts a block diagram of a detector component, in accordance with various aspects and embodiments of the disclosed subject matter.

In accordance with various embodiments, the SMC 116 can comprise a detector component 118 that can detect excessive signaling and/or malicious events by communication devices associated with base stations (e.g., base station 112 or one or more associated cells) of one or more RANs, such as RAN 110. Referring to FIG. 2 (along with FIG. 1), FIG. 2 depicts a block diagram of the detector component 118, in accordance with various aspects and embodiments of the disclosed subject matter. The detector component 118 can receive various types of information, including information relating to registration events associated with the RAN 110 and information relating to control signals associated with communication devices, via a desired interface, such as, for example, an E2 interface 202. The various types of information can comprise, for example, information relating to communication condition parameters and configuration parameters associated with communication devices associated with the RAN 110, information relating to control signals, and/or other desired information. The communication condition parameters associated with a communication device (e.g., 104, 106, or 108) can comprise, for example, a received signal strength indicator (RSSI), a received signal received power (RSRP), a received signal received quality (RSRQ), a channel quality indicator (CQI), a signal to interference and noise ratio (SINR), a timing advance (TA) associated with the communication device, and/or another desired measurement or value relating to communication conditions. The configuration parameters associated with a communication device (e.g., 104, 106, or 108) can comprise, for example, a quality of service class identifier (QCI), allocation and retention priority (ARP) parameter, a mobility management entity or access management function (MME/AMF) code, a MME/AMF group identifier, a band frequency, or other desired configuration parameter associated with the communication device.

In some embodiments, with regard to each control signal (e.g., attach request or other type of control signal or communication) received from a communication device (e.g., 104, 106, or 108), the detector component 118 can analyze the information comprising or relating to such control signal. Based at least in part on the results of the analysis, the detector component 118 can determine the type of control signal (e.g., initial attach request, update attach request, authentication update request, PGW update request, connection request, handover-related signal, or other type of control signal), the time that such control signal was received or communicated, and/or other information relating to the control signal or associated communication device.

The detector component 118, employing an aggressive device detector component 204, can determine whether a total number of control signals received by the base station 112 (e.g., cell of the base station 112) from communication devices (e.g., 104, 106, or 108) associated with the base station 112 during a defined time period satisfies (e.g., breaches, or meets or exceeds) a defined threshold total number of control signals that can be indicative of excessive signaling, based at least in part on the results of analyzing activity (e.g., communication of signals, such as control signals) associated with the base station 112 and communication devices (e.g., 104, 106, or 108). The defined threshold total number of control signals that can be applicable at the time of such analysis can be based at least in part on a number of factors, which can include the classification of the cell or associated base station (e.g., base station 112), the type of control signal, whether one type or more than one type of control signal is being considered, the length of the defined time period, the time of day, time of week, time or month, or time of year when such analysis is being performed, and/or other desired factors.

In certain embodiments, the detector component 118 can comprise a cell classifier component 206 that can classify a cell (and/or associated base station (e.g., base station 112)) based at least in part on a number of factors, such as, for example, the activity level associated with a cell, location of the cell, terrain and/or geography of the cell site of the cell, and/or other desired factors, as more fully described herein. In some embodiments, the detector component 118 (e.g., employing a machine learning component) can train and/or refine the cell classifier component 206, using machine learning techniques and algorithms, to enable the cell classifier component 206 to more desirably (e.g., accurately, suitably, and/or efficiently) classify cells and/or associated base stations, such as more fully described herein. For instance, the cell classifier component 206, using the machine learning techniques and algorithms, can determine and build a profile for each cell (and/or associated base station (e.g., base station 112)) of the communication network 102, wherein the profile can comprise information relating to various parameters, such as, for example, volume of connectivity and mobility events, signal power, signal quality, and behavior associated with the cell during various different times of the day, the week, the month, the year, and/or with regard to special events (e.g., holidays, sporting events, entertainment events, or other special events). These parameters can vary for different cells, for example, based at least in part on whether a cell site of a cell is located in a metropolitan area or a rural area, the terrain and/or geography of the cell site of the cell, and/or other factors.

For instance, a first cell or base station can be in a busy metropolitan area, a second cell or base station can be located in a relatively rural and less busy area, a third cell or base station can be located in an area where there are various significant obstructions (e.g., hills, mountains, or tall buildings) that can impact the operation of the third cell or base station. The cell classifier component 206, using the machine learning techniques and algorithms, can analyze (e.g., perform a machine learning analysis on) the characteristics of the respective cells or base stations, and, based on such analysis, can classify the respective cells or base stations and determine respective defined threshold total number of control signals or respective sets of defined threshold total number of control signals that can be used for the respective cells or base stations.

For example, with regard to a first cell or base station, which has a first classification, the cell classifier component 206 can determine and the aggressive device detector component 204 can apply a first defined threshold total number of control signals or first set of defined threshold total number of control signals that can have a relatively high number(s) due in part to the first cell or base station being located in a relatively busy area with regard to wireless communication activity. With regard to a second cell or base station, which has a second classification, the cell classifier component 206 can determine and the aggressive device detector component 204 can apply a second defined threshold total number of control signals or second set of defined threshold total number of control signals that can have a relatively lower number(s) than that of the first cell or base station due in part to the second cell or base station being located in a relatively less busy area with regard to wireless communication activity.

As another example, with regard to a particular cell or associated base station (e.g., base station 112), and based on the classification of such cell or associated base station, the cell classifier component 206 can determine a first defined threshold total number of control signals that can be applicable to the particular cell or base station during a first time period of the day (or week or month or year) due to the relatively higher level of wireless communication activity (e.g., relatively busy) associated with that first time period. The cell classifier component 206 also can determine a second defined threshold total number of control signals that can be applicable to the particular cell or associated base station during a second time period of the day (or week or month or year) due to the relatively lower level of wireless communication activity (e.g., not too busy) associated with that second time period, wherein the first defined threshold total number can be higher than the second defined threshold total number due in part to the relatively higher level of wireless communication activity associated with the first time period and the relatively lower level of wireless communication activity associated with the second time period.

As still another example, with regard to a cell (or associated base station (e.g., base station 112)), as part of the classification of the cell, the cell classifier component 206 can determine defined threshold total numbers of control signals based at least in part on the type of control signal (e.g., a first defined threshold total number of control signals can be applied to a first type of control signal, and a second defined threshold total number of control signals can be applied to a second type of control signal). As yet another example, the cell classifier component 206 can determine a defined threshold total numbers of control signals that can be applied with regard to all types of control signals and respective defined threshold total numbers of control signals that can be applied with regard to respective types of control signals, with regard to a cell (or associated base station (e.g., base station 112)), as part of the classification of the cell.

In response to the aggressive device detector component 204 determining that the total number of control signals received by the base station 112 (or associated cell) from the communication devices (e.g., 104, 106, and/or 108) during the defined time period does not satisfy (e.g., does not breach, or does not meet or exceed) the applicable defined threshold total number of control signals, the aggressive device detector component 204 can determine that there is not an indication of excessive signaling by the communication devices. The detector component 118 can continue to monitor the communication activity associated with the base station 112 (or cell) and perform additional analyses to facilitate detecting excessive signaling and/or malicious events, if any occur.

If, instead, the aggressive device detector component 204 determines that the total number of control signals received by the base station 112 (or associated cell) from the communication devices (e.g., 104, 106, and/or 108) during the defined time period satisfies the applicable defined threshold total number of control signals, the aggressive device detector component 204 can determine that there can be, or at least potentially can be, one or more communication devices that are engaging in excessive signaling against the base station 112 (or associated cell). In further response, the aggressive device detector component 204 can identify one or more communication devices (e.g., 104, 106, and/or 108) associated with the base station 112 based at least in part on the results of analyzing information relating to respective communication conditions (e.g., respective communication condition, signaling, or messaging characteristics) associated with respective communication devices associated with (e.g., connected to) the base station 112. The aggressive device detector component 204 can utilize the respective communication conditions of the respective communication devices (e.g., 104, 106, and/or 108) to identify (at least indirectly identify) the communication devices based at least in part on their respective communication signatures (e.g., communication condition signatures), since the device and subscriber identifiers (e.g., IMEI or IMSI) associated with the communication devices are not made available to the detector component 118 or other components of or associated with the communication network 102. For example, the aggressive device detector component 204 can determine that a set of signaling (e.g., a set or group of control signals or other type of signals or messages) can be attributed to a certain communication device (e.g., an aggressive or excessive signaling, and/or malicious acting, communication device) based at least in part on the results of analyzing the signal characteristics (e.g., communication condition signature) associated with the certain communication device in relation to (e.g., in contrast to) the signal characteristics of other communication devices.

For instance, the detector component 118 can receive information relating to the communication conditions (e.g., communication condition parameters) of the communication devices (e.g., 104, 106, and/or 108) associated with the base station 112 from the communication devices, base station 112, RAN 110, or other network component of the communication network 102, such as described herein. The communication condition parameters associated with a communication device (e.g., 104, 106, or 108) can comprise, for example, RSSI, RSRP, RSRQ, CQI, SINR, and/or TA associated with the communication device, and/or another desired measurement or value relating to communication conditions, such as described herein. The RSSI, RSRP, and RSRQ can indicate signal quality or signal power, which typically can have relatively low variance over time with regard to communication devices that do not change position (e.g., location). The CQI can indicate the quality of the communication channel, wherein the CQI can have a range of values that can range from a low number (e.g., 0), which can indicate a low, poor, or bad quality of the communication channel, to a high number (e.g., 30), which can indicate a high or good quality communication channel. The TA parameter can be calculated by the base station 112 to determine the round-trip time delay of messages from the base station 112 to a communication device (e.g., 104, 106, or 108) and back to the base station 112. The TA parameter can have a relatively high correlation with the distance (e.g., radius) of the communication device from the antenna of the base station 112.

There can be many communication devices (e.g., 104, 106, and/or 108) that can be stationary or fixed at a location, or at least can be substantially stationary (e.g., not moved very often over a period of time and/or only moved over a small distance, such as moved while inside a house, over the period of time). As a result, such communication devices often can have same or similar communication conditions (e.g., same or similar RSSI, same or similar RSRP, same or similar RSRQ, same or similar CQI, same or similar SINR, or same or similar TA) over a period of time. This can enable the detector component 118 to utilize the respective measurement values of the respective communication conditions of respective communication devices (e.g., 104, 106, and/or 108) to identify the respective communication devices. Even in instances where a communication device is moving, the detector component 118 (e.g., employing the aggressive device detector component 204) often can determine, predict, or infer measurement values (e.g., changes in measurement values) of communication conditions of the communication device as the device is moving based at least in part on the speed of movement of the communication device, the location of the communication device relative to the base station 112, the direction of movement of the communication device relative to the base station 112, and/or other desired factors. For example, if a communication device is traveling in a car down a highway at a certain speed, the detector component 118 can or may be able to determine, predict, or infer measurement values (e.g., changes in measurement values) of communication conditions of the communication device as the device is moving down the highway based at least in part on the speed, the location, and/or the direction of movement of the communication device relative to the base station 112, and/or other desired factors.

The aggressive device detector component 204 can analyze the information relating to the communication conditions of the communication devices (e.g., 104, 106, and/or 108). Based at least in part on the results of analyzing the information relating to the communication conditions, the aggressive device detector component 204 can determine or identify measurements of communication conditions (e.g., signal characteristics) that can identify (e.g., can be a communication signature of) a communication device (e.g., 104, 106, or 108), wherein, for example, multiple same or similar measurements of communication conditions can indicate that such communication conditions can be associated with the same communication device. For example, a first communication device (e.g., 104) can have a first TA value, and a second communication device (e.g., 106) can have a second TA value. The aggressive device detector component 204 can distinguish between and identify the first communication device and the second communication device based at least in part on the first TA value associated with the first communication device and the second TA value associated with the second communication device.

In some embodiments, the aggressive device detector component 204 can determine (e.g., calculate) a calculated parameter value for a communication device (e.g., 104, 106, or 108) based at least in part on (e.g., as a function of or as a combination of) a group of communication condition parameters (e.g., RSSI, RSRP, RSRQ, CQI, SINR, TA, and/or another desired communication condition parameter) associated with the communication device, wherein the calculated parameter value can represent, at least in part, the communication signature associated with the communication device. For instance, the aggressive device detector component 204 can determine a first calculated parameter value associated with a first communication device (e.g., 104) based at least in part on a first group of communication condition parameters associated with the first communication device, and can determine a second calculated parameter value associated with a second communication device (e.g., 106) based at least in part on a second group of communication condition parameters associated with the second communication device. The aggressive device detector component 204 can distinguish between and identify the first communication device (e.g., 104) and the second communication device (e.g., 106) based at least in part on the results of analyzing the first calculated parameter value associated with the first communication device and the second calculated parameter value associated with the second communication device.

By identifying or determining the respective signal characteristics (e.g., respective communication signatures) of the respective communication devices, the aggressive device detector component 204 can correlate signals or messages associated with different temporary identifiers and can attribute all of those signals or messages to a single communication device (e.g., an aggressive or excessive signaling, and/or malicious acting, communication device), even though such signals or messages are associated with different temporary identifiers. For example, the cell or associated base station 112 can receive a set of signals (e.g., control signals, other type of signals, or messages) with temporal identifiers from communication devices (e.g., 104, 106, and/or 108), wherein the set of signals can comprise a first signal associated with a first temporal identifier (e.g., 10), a second signal associated with a second temporal identifier (e.g., 20), a third signal associated with a third temporal identifier (e.g., 30), a fourth signal associated with a fourth temporal identifier (e.g., 50), a fifth signal associated with a fifth temporal identifier (e.g., 60), a sixth signal associated with a sixth temporal identifier (e.g., 90), a seventh signal associated with a seventh temporal identifier (e.g., 110), and an eighth signal associated with an eighth temporal identifier (e.g., 160).

The aggressive device detector component 204 can analyze the respective signal characteristics (e.g., RSSI, RSRP, RSRQ, CQI, SINR, TA, and/or other type of signal characteristic (e.g., communication condition)) associated with the respective signals of the respective signals of the set of signals. Based at least in part on the results of analyzing the signal characteristics of the respective signals, the aggressive device detector component 204 can determine or identify that the respective signal characteristics of the second signal, fourth signal, fifth signal, seventh signal, and eighth signal can be the same or substantially the same as each other, while the first signal, third signal, and sixth signal can have relatively different signal characteristics than the second, fourth, fifth, seventh, and eighth signals. As a further result of such analysis, the aggressive device detector component 204 can determine that a subset of the signals (e.g., the second signal, fourth signal, fifth signal, seventh signal, and eighth signal) can be attributed to the same communication device (e.g., 104), based at least in part on the result of determining that the respective signal characteristics of the respective signals of the subset of signals are the same or substantially the same as each other (e.g., same or similar RSSI values, same or similar RSRP values, same or similar RSRQ values, same or similar CQI values, same or similar SINR values, same or similar TA values, and/or same or similar other communication condition parameter values), even though the second signal, fourth signal, fifth signal, seventh signal, and eighth signal are associated with different temporal identifiers. The aggressive device detector component 204 also can determine that the other signals (e.g., the first signal, third signal, and sixth signal) can be attributed to one or more other communication devices (e.g., 106 and/or 108) based at least in part on the analysis results indicating that the signal characteristics of these other signals are significantly different from the signal characteristics of the subset of signals attributed to the other communication device (e.g., 104).

While in many (e.g., most) cases a combination of measurements of communication conditions can provide a sufficient communication signature associated with a communication device, there still potentially can be cases where false positives can occur with regard to the identification of a communication device or whether a communication device is acting in a benign manner or is engaging in excessive signaling (e.g., where a benign communication device has similar measurements of communication conditions as an excessive signaling communication device). In some embodiments, to improve (e.g., increase) accuracy in identifying communication devices, in addition to analyzing communication conditions associated with communication devices, the aggressive device detector component 204 can analyze respective configuration parameters and/or other information associated with respective communication devices (e.g., 104, 106, and/or 108) to facilitate identifying communication devices. As disclosed herein, the configuration parameters associated with a communication device can comprise, for example, QCI, ARP, MME/AMF code, MME/AMF group identifier, band frequency, or other desired configuration parameter associated with the communication device. Different communication devices can or may have a different configuration parameter or different groups of configuration parameters, which the aggressive device detector component 204 can utilize to facilitate distinguishing between and identifying communication devices. The aggressive device detector component 204 can analyze the configuration parameters, for example, to confirm an identification of a communication device that was determined based on the communication conditions associated with that communication device, improve (e.g., increase) or at least attempt to improve, a confidence level in the identification of the communication device, and/or eliminate false positives. In certain embodiments, the aggressive device detector component 204 can determine (e.g., calculate) a calculated parameter value for a communication device (e.g., 104, 106, or 108) based at least in part on (e.g., as a function of) the group of communication condition parameters and a group of configuration parameters (e.g., QCI, ARP, MME/AMF code, MME/AMF group identifier, band frequency, and/or another desired configuration parameter) associated with the communication device, wherein the calculated parameter value can represent, at least in part, the communication signature associated with the communication device.

The aggressive device detector component 204 can evaluate one or more communication devices (e.g., identified communication devices) associated with the base station 112, and, for each communication device (e.g., 104, 106, or 108), can determine whether to classify the communication device as an excessive signaling communication device based at least in part on whether the number of control signals received from the communication device by the base station 112 during the defined time period satisfies a defined threshold number of control signals that can be indicative of excessive signaling by the communication device, in accordance with the defined communication management criteria.

If the aggressive device detector component 204 determines that no communication device satisfies the defined threshold number of control signals, the aggressive device detector component 204 can determine that no excessive signaling or malicious communication device has been detected. The detector component 118 can continue to monitor communication devices associated with the RAN 110 to detect whether any excessive signaling or malicious communication devices are acting against the RAN 110. If, instead, the aggressive device detector component 204 determines that a communication device (e.g., 104, 106, or 108) satisfies (e.g., breaches, or meets or exceeds) the defined threshold number of control signals, the aggressive device detector component 204 can determine that the communication device is an excessive signaling communication device.

Figure 3:
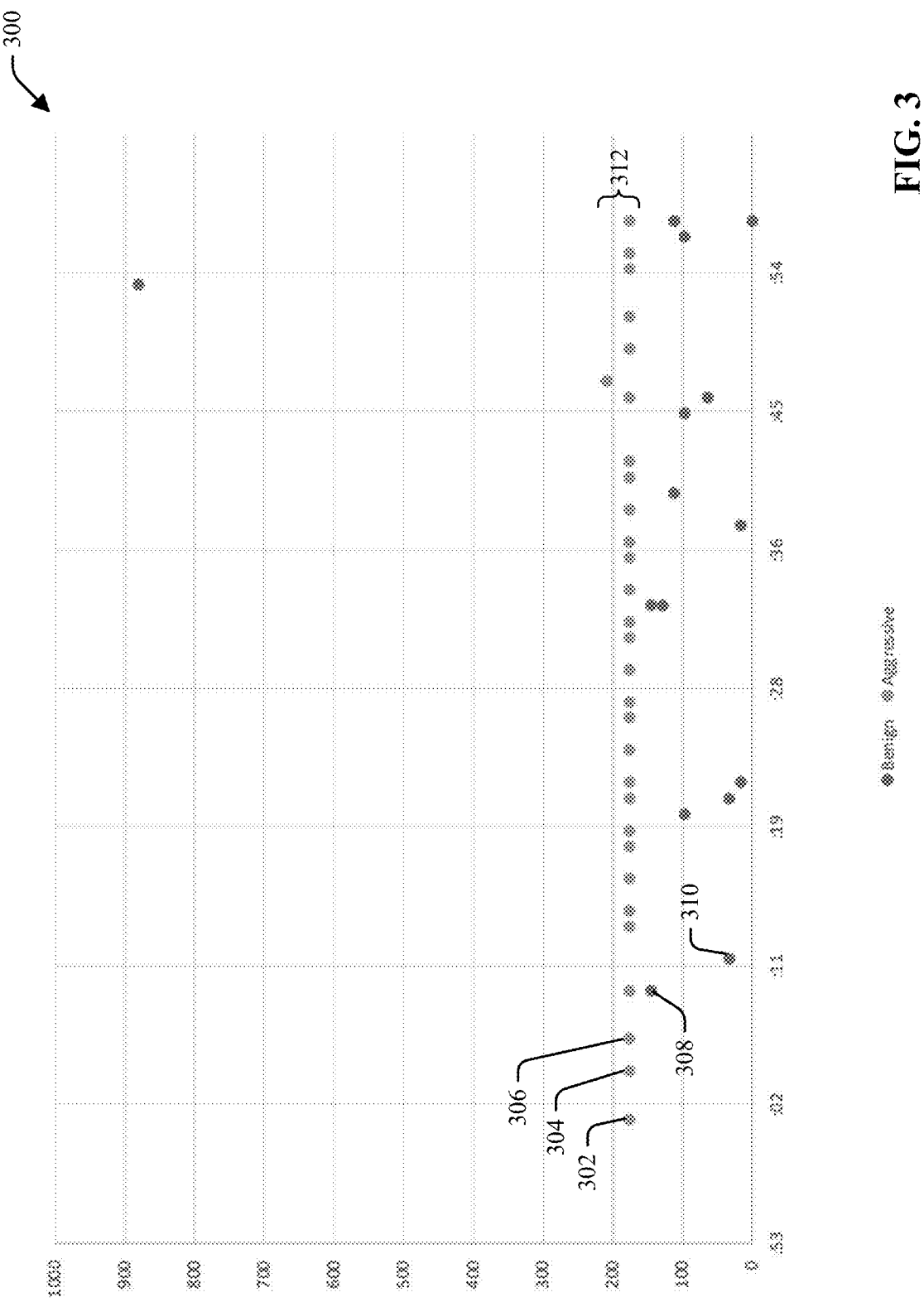
FIG. 3 depicts a diagram of an example graph of attach activity for a single cell over a one-minute period, in accordance with various aspects and embodiments of the disclosed subject matter.
Figure 4:
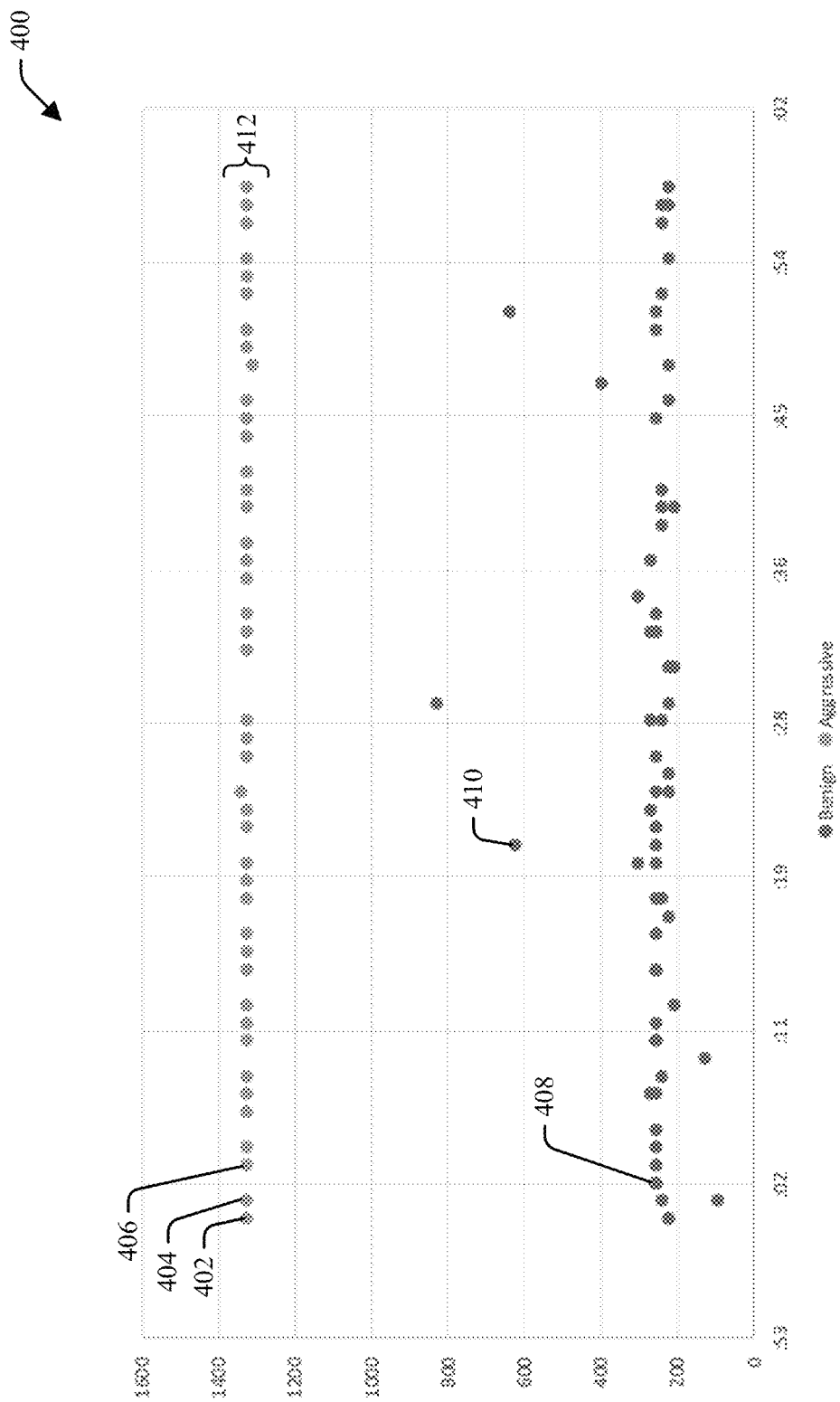
FIG. 4 depicts a diagram of another example graph of attach activity for another single cell over a one-minute period, in accordance with various aspects and embodiments of the disclosed subject matter.

Referring briefly to FIGS. 3 and 4 (along with FIGS. 1 and 2), FIGS. 3 and 4 depict diagrams of example graphs 300 and 400, respectively, of respective attach activity for respective single cells over a one-minute period, in accordance with various aspects and embodiments of the disclosed subject matter. The cell activity levels are considered to be relatively moderate to higher than normal. The example graph 300 presents time (e.g., the one-minute period) on the x-axis, and calculated parameter value on the y-axis, wherein the detector component 118 (e.g., employing the aggressive device detector component 204) can determine (e.g., calculate) the calculated parameter values based at least in part on (e.g., as a function of) the group of communication condition parameters and the group of configuration parameters of each of the communication devices. The example graph 300 illustrates that there are 45 attach events (e.g., attach event 302, attach event 304, attach event 306, attach event 308, attach event 310) at the cell over the one-minute period. Based at least in part on the results of analyzing the attach events, the aggressive device detector component 204 can attribute 15 of the attach events to 11 communication devices (e.g., benign acting communication devices), and can attribute the other 30 attach events to a single excessive signaling communication device, which can be identified by the aggressive device detector component 204 based at least in part on the single excessive signaling communication device having a substantially consistent communication signature, as indicated by calculated parameter values of the excessive signaling communication device being substantially consistent for the attach events (e.g., attach event 302, attach event 304, attach event 306) over the one-minute period, as illustrated at reference numeral 312.

The example graph 400 of FIG. 4 presents time (e.g., the one-minute period) on the x-axis, and calculated parameter value on the y-axis, wherein the detector component 118 (e.g., employing the aggressive device detector component 204) can determine the calculated parameter values based at least in part on the group of communication condition parameters and the group of configuration parameters of each of the communication devices. The example graph 400 illustrates that there are 107 attach events (e.g., attach event 402, attach event 404, attach event 406, attach event 408, attach event 410) at this other cell over a one-minute period. Based at least in part on the results of analyzing the attach events, the aggressive device detector component 204 can attribute 63 of those attach events to 36 communication devices (e.g., benign acting communication devices), and can attribute the other 44 attach events to a single excessive signaling communication device, which can be identified by the aggressive device detector component 204 based at least in part on the single excessive signaling communication device having a substantially consistent communication signature, as indicated by the calculated parameter values of the excessive signaling communication device being substantially consistent for the attach events (e.g., event 402, attach event 404, attach event 406) over the one-minute period, as illustrated at reference numeral 412.

With further regard to FIGS. 1 and 2, in response to determining that a communication device(s) (e.g., 104, 106, or 108) is an excessive signaling and/or malicious acting communication device, the detector component 118 (e.g., employing the aggressive device detector component 204) can determine (e.g., calculate) and generate a set of statistics relating to the excessive signaling of the communication device(s), as indicated at reference numeral 208. In accordance with various embodiments, the detector component 118 can determine and generate a set of statistics with regard to an individual excessive signaling communication device, or can determine and generate a set of statistics for a group of excessive signaling communication devices. The set of statistics can provide desired (e.g., relevant or suitable) information regarding the excessive signaling to enable the SMC 116 or user to learn more about the excessive signaling and/or to facilitate making determinations regarding how to respond to the excessive signaling (e.g., taking mitigation action to mitigate the excessive signaling). The set of statistics can comprise a device identifier (e.g., UE_ID) that the detector component 118 can assign to an excessive signaling communication device to facilitate identifying the communication device (e.g., since the IMEI and IMSI are not available to the detector component 118).

The set of statistics also can comprise an exception level, which can indicate the how exceptional or concerning the excessive signaling of the excessive signaling communication device is. The detector component 118 can determine the exception level based at least in part on one or more defined threshold exception levels and the results of analyzing information relating to the excessive signaling of a communication device. The exception levels can relate to respective response categories, such as, for example, alert (e.g., alert the SMC 116, communication network 102, or user about the detected excessive signaling), log and learn (e.g., track and log more information regarding the excessive signaling to learn more about the excessive signaling and/or excessive signaling device(s)), throttle (e.g., recommend, suggest, or indicate that the excessive signaling is particularly problematic or harmful, or potentially harmful, to the RAN 110, base station 112, or communication network 102, and throttling (e.g., partially blocking) of the excessive signaling device(s) to block at least a portion of the attempts by the device to attach to, connect to, or communicate with the base station 112 (or other base stations) may be warranted), block (e.g., recommend, suggest, or indicate that the excessive signaling is particularly problematic or harmful, or potentially harmful, to the RAN 110, base station 112, or communication network 102, and blocking of the excessive signaling device(s) may be warranted), or another desired response category. If the detector component 118 determines that a lower defined threshold exception level has been satisfied with regard to an excessive signaling communication device, the detector component 118 can assign a relatively lower exception level (e.g., alert exception level, or log and learn exception level) to the excessive signaling communication device. If the detector component 118 determines that a higher (e.g., highest) defined threshold exception level has been satisfied with regard to an excessive signaling communication device, the detector component 118 can assign a higher exception level (e.g., block exception level) to the excessive signaling communication device.

The set of statistics also can comprise an exception trend. Based at least in part on the results of analyzing information relating to the excessive signaling of a communication device, the detector component 118 can determine an exception trend of the signaling by the communication device. For instance, if the detector component 118 determines that the signaling by the excessive signaling communication device has been increasing over time, the detector component 118 can determine that the excessive signaling is trending upward and can indicate that the exception trend is upward. If, instead, the detector component 118 determines that the signaling by the excessive signaling communication device has been decreasing over time, the detector component 118 can determine that the excessive signaling is trending downward and can indicate that the exception trend is downward. If, instead, the detector component 118 determines that the signaling by the excessive signaling communication device has been relatively stable over time, the detector component 118 can determine that the excessive signaling is relatively stable and can indicate that the exception trend is stable. If, instead, the detector component 118 is unable to determine the trend of the signaling by the excessive signaling communication device, the detector component 118 can indicate that the exception trend is unknown.

In some embodiments, the set of statistics can comprise calculated periodic communication values. For example, the detector component 118 can determine an average number of control signals (e.g., attach signals, update signals, or other type of control signal) associated with an excessive signaling communication device over each time period of a set of time periods. The average number can be or represent a true average, a median, a mean, a mode, or other mid-point value that can represent or indicate a level or frequency of control signaling over a particular time period. As another example, the detector component 118 can determine a variance value relating to the communication of control signals by an excessive signaling communication device. The variance value can indicate whether there is one or more spikes (e.g., peaks) in control signaling by the excessive signaling communication device (e.g., one or more time periods where the excessive signaling spikes higher relative to one or more other time periods where the signaling is relatively lower). The detector component 118 can determine the exception trend based at least in part on the periodic communication values.

The set of statistics also can include time information, such as a start time(s) and end time(s), associated with the various other statistics of the set of statistics. For instance, a start and stop time can be over a one-minute period, a one-hour period, a one-day period, a one-week period, a one-month period, a one-year period, or other desired period of time.

The set of statistics further can comprise a confidence level(s) that can indicate the level of confidence in the identification of a communication device, the level of confidence in a determination that a communication device is an excessive signaling and/or maliciously acting communication device, and/or an overall confidence level relating to the identification of the device and determination that it is an excessive signaling device. The detector component 118 can determine (e.g., calculate) a confidence level(s) based at least in part on the results of analyzing the group of communication condition parameters, the group of configuration parameters, calculated parameter values, and/or other desired (e.g., relevant or suitable) information. For instance, if a group of calculated parameter values are relatively consistent (e.g., same or substantially the same) over a period of time, the detector component 118 can determine that there is a relatively high confidence level that the calculated parameter values of the group of calculated parameter values are associated with a same communication device and the group of calculated parameter values can represent a communication signature of the communication device. If, instead, a group of calculated parameter values not very consistent (e.g., vary somewhat relative to each other) over a period of time, the detector component 118 can determine that there is a relatively lower confidence level that the calculated parameter values of the group of calculated parameter values are associated with a same communication device.

As another example, if the detector component 118 determines that an identified communication device has been excessively signaling on a relatively consistent basis over a number of periods of time, the detector component 118 can determine that there is a relatively high confidence level that the communication device is an excessive signaling communication device. If, instead, the detector component 118 determines that an identified communication device was excessively signaling on a relatively inconsistent basis over a number of periods of time (e.g., where the device was determined to be excessively signaling over one or a small number of periods of time, but not excessive signaling over most of the periods of time under consideration), the detector component 118 can determine that there is a relatively lower confidence level that the communication device is an excessive signaling communication device.

In certain embodiments, to facilitate determining whether a communication device is an aggressive (e.g., excessive signaling and/or malicious acting) communication device, determining a level of aggressiveness (e.g., excessive signaling) of an excessive signaling communication device, and/or determining a type of communication device that is engaging in aggressive behavior against the RAN 110, the detector component 118 can comprise a device type reputation component 210 that can receive information relating to device type reputations of communication devices via a desired interface, such as A1 interface 212, from the core network of the communication network 102. While information relating to device type reputations of communication devices may not always be available to the detector component 118, in some instance, the detector component 118 (e.g., employing the device type reputation component 210) can obtain such information from the core network.

For example, if a communication device (e.g., 104) is an aggressive communication device that was not yet identified as aggressive (e.g., excessive signaling) by the detector component 118 or was not blocked by the SMC 116, the communication can be allowed to continue its registration attempt all the way to the core network (e.g., using non-access stratum (NAS) messages). In such instances, the device identifiers (e.g., IMEI, IMSI) can be revealed to the core network and information relating to the device identifiers (but not the device identifiers themselves) can be received by the device type reputation component 210 via the A1 interface 212.

Such information can comprise the device vendor and model of a communication device, which can be represented in the type allocation code (TAC) associated with the communication device (e.g., 104). The TAC of a communication device can be mapped to the C-RNTI and/or TMSI, wherein such mapping can be part of the information relating to the device type reputation device that can be received by the device type reputation component 210. The device type reputation information can be useful to facilitate detecting aggressive communication devices of a certain type (e.g., device vendor and/or device model) that can or potentially can engage in common aggressive behavior (e.g., due to a vulnerability in the type of communication device that renders it susceptible to being infected with malware).

The device type reputation component 210 can maintain information relating to the device type reputations of devices, including information regarding common aggressive behavior of certain types (e.g., certain device vendor(s) and/or device model(s)) of communication devices. The device type reputation component 210 also can maintain information regarding signaling patterns of certain types of communication devices. The device type reputation component 210 can provide such information relating to the device type reputations of devices to the aggressive device detector component 204 for use by the aggressive device detector component 204 to facilitate detecting aggressive communication devices and/or determining when certain types of communication devices, while engaging in relatively higher levels of communicating control signaling than other communication devices, are not aggressive signaling devices, but rather are devices that merely engage in more signaling than other types of communication devices. Information relating to the device type reputations of devices, such as, for example, certain information relating to certain types (e.g., certain device vendor(s) and/or device model(s)) of communication devices, can be attributed to all future attempts (e.g., attach attempts or other control signaling) to signal the core network by communication devices of that certain type, as the temporary identifiers of the certain types of communication devices can be mapped to the TAC.

Information relating to common aggressive behavior of certain types of communication devices can be useful (e.g., helpful) in cases, for example, where the detector component 118 can know a-priori that a certain device model has a vulnerability that can cause the certain device model of communication device to undesirably (e.g., excessively) attempt to attach to the core network once every two seconds, or another particular device model has a vulnerability that can cause the particular device model of communication device to undesirably (e.g., excessively) attempt to attach to the core network every time the particular device model of communication device is moved. As part of its analysis to determine whether a communication device(s) is an aggressive (e.g., excessive signaling) communication device, the aggressive device detector component 204 can analyze the information relating to device type information, the information relating to cell classification, and other received information (e.g., information relating to communication conditions, and/or information relating to configuration parameters), and based at least in part on the analysis results, can determine whether a communication device(s) is an aggressive communication devices(s), in accordance with the defined communication management criteria. This can enable the aggressive device detector component 204 to more accurately determine whether a communication device is an aggressive communication device or not (e.g., can reduce false positive determinations of aggressive signaling by devices, and/or can reduce false positive determinations of benign actions by communication devices that actually are aggressive communication devices).

As another example, a particular type of communication device (e.g., particular device vendor(s) and/or device model(s)) can, as part of normal operation, communicate a relatively higher number of control signals to the base station 112 than other types of communication devices. The aggressive device detector component 204 can receive information relating to the device type information of such particular type of communication device from the device type reputation component 210, and can take into account (e.g., incorporate into its analysis) that this particular type of communication device, as part of its normal operation, communicates a relatively higher number of control signals to the base stations. This can enable the aggressive device detector component 204 to be more accurate in determining whether a communication device (e.g., the particular type of communication device) is an aggressive communication device or not, as this can reduce false positive determinations that this particular type of communication device is an aggressive communication device in instances where such communication device is merely engaging in normal (albeit a relatively higher level of) communication of control signaling to a base station.

In some embodiments, the SMC 116 can comprise a connection manager component 120 that can determine whether to perform a mitigation action or other action (e.g., logging and learning action, alert action) with regard to an aggressive (e.g., excessive signaling) communication device (e.g., 104) based at least in part on the information, including the set of statistics, received from the detector component 118, in accordance with the defined communication management criteria. For example, if, based at least in part on the results of the analysis of the set of statistics and/or other information relating to a communication device (e.g., 104), the connection manager component 120 determines that the exception level is not too high (e.g., level of excessive signaling is not too high) and/or the exception trend is not indicating that the excessive signaling is trending upward, the connection manager component 120 can or may determine that an action(s), such as an alert action or a logging and learning action, other than blocking or throttling of the communication device (e.g., 104) can be the action(s) to be performed (e.g., by the SMC 116), when doing so is in accordance with the defined communication management criteria. In response to determining that an alert action or a logging and learning action is to be performed with regard to the communication device (e.g., 104), the connection manager component 120 can generate alert instructions or logging and learning instructions and can communicate the alert instructions or logging and learning instructions to the RAN 110, base station 112, the detector component 118, another component of the SMC 116, or another component of the communication network 102. In response to such instructions, the RAN 110, base station 112, the detector component 118, another component of the SMC 116, or another component of the communication network 102 can generate an alert regarding the excessive signaling communication device (e.g., to alert a user or a component of or associated with the core network regarding the excessive signaling communication device), or can log information regarding the excessive signaling communication device to facilitate learning more about the excessive signaling communication device, other similar excessive signaling communication devices, and/or vulnerabilities or malware associated with the excessive signaling communication device.

As another example, if, based at least in part on the results of the analysis of the set of statistics and/or other information relating to a communication device (e.g., 104), the connection manager component 120 determines that the exception level is relatively high (e.g., level of excessive signaling is relatively high) and/or the exception trend is indicating that the excessive signaling is trending upward (e.g., and is at or is heading towards a relatively high level), the connection manager component 120 can or may determine that a mitigation action to block or throttle the communication device (e.g., 104) can be the action(s) to be performed (e.g., by the SMC 116), when doing so is in accordance with the defined communication management criteria. In response to determining that the mitigation action to block the communication device (e.g., 104) is to be performed, the connection manager component 120 can generate blocking instructions and can communicate the blocking instructions to the base station 112. In response to the blocking instructions, the base station 112 can block or disconnect the excessive signaling communication device (e.g., 104) to disconnect the communication from the base station 112 or prevent the communication device from the connecting to the base station 112. In response to determining that the mitigation action to throttle (e.g., partially block) the communication device (e.g., 104) is to be performed, the connection manager component 120 can generate throttling instructions and can communicate the throttling instructions to the base station 112. In response to the throttling instructions, the base station 112 can throttle the communication device block at least a desired portion (e.g., 50%, 60%, 70%, 80%, or other desired portion greater or less than 80%) of the attempts of the excessive signaling communication device (e.g., 104) to attach to, connect to, or communicate with the base station 112 (or other base stations or cells, such as other base stations or cells associated with the RAN 110).

For instance, with regard to blocking or disconnecting of an excessive signaling communication device (e.g., 104) by or from the base station 112, even though the SMC 116 does not know the permanent device or subscriber identifiers (e.g., IMEI, IMSI) associated with the excessive signaling communication device, the detector component 118 has identified the communication signature of the excessive signaling communication device. To facilitate blocking or disconnecting the excessive signaling communication device (e.g., 104), the connection manager component 120 can instruct the RAN 110 or base station 112 to block or disconnect all or some (e.g., a desired portion or percentage of) communication devices that have a communication signature that is same as or substantially similar to the communication signature identified for the excessive signaling communication device (e.g., 104), which will, or at least very likely will, result in the blocking or disconnecting of the excessive signaling communication device (e.g., 104) by or from the base station 112. For example, if the excessive signaling communication device (e.g., 104) has a particular calculated parameter value, a particular communication condition value, or a particular set of communication condition values, the connection manager component 120 can instruct the RAN 110 or base station 112 to block or disconnect all or some communication devices that have a calculated parameter value that falls in a range of calculated parameter values that can be determined based at least in part on, and can comprise, the particular calculated parameter value; block or disconnect all or some communication devices that have a communication condition value that falls in a range of communication condition values that can be determined based at least in part on, and can comprise, the particular communication condition value; or block or disconnect all or some communication devices that have a particular set of communication condition values where the respective communication condition values in the set fall in respective ranges of communication condition values that can be determined based at least in part on, and can comprise, the particular set of communication condition values. The connection manager component 120 can thereby effectively block the excessive signaling communication device (e.g., 104) without having to block benign acting (e.g., non-aggressive or non-malicious) communication devices (e.g., 106 or 108), which can have communication signatures that can be different from the communication signature of the excessive signaling communication device (e.g., 104).

Other aspects and embodiments of the disclosed subject matter will be described with regard to the other figures (and/or FIG. 1).

Figure 5:
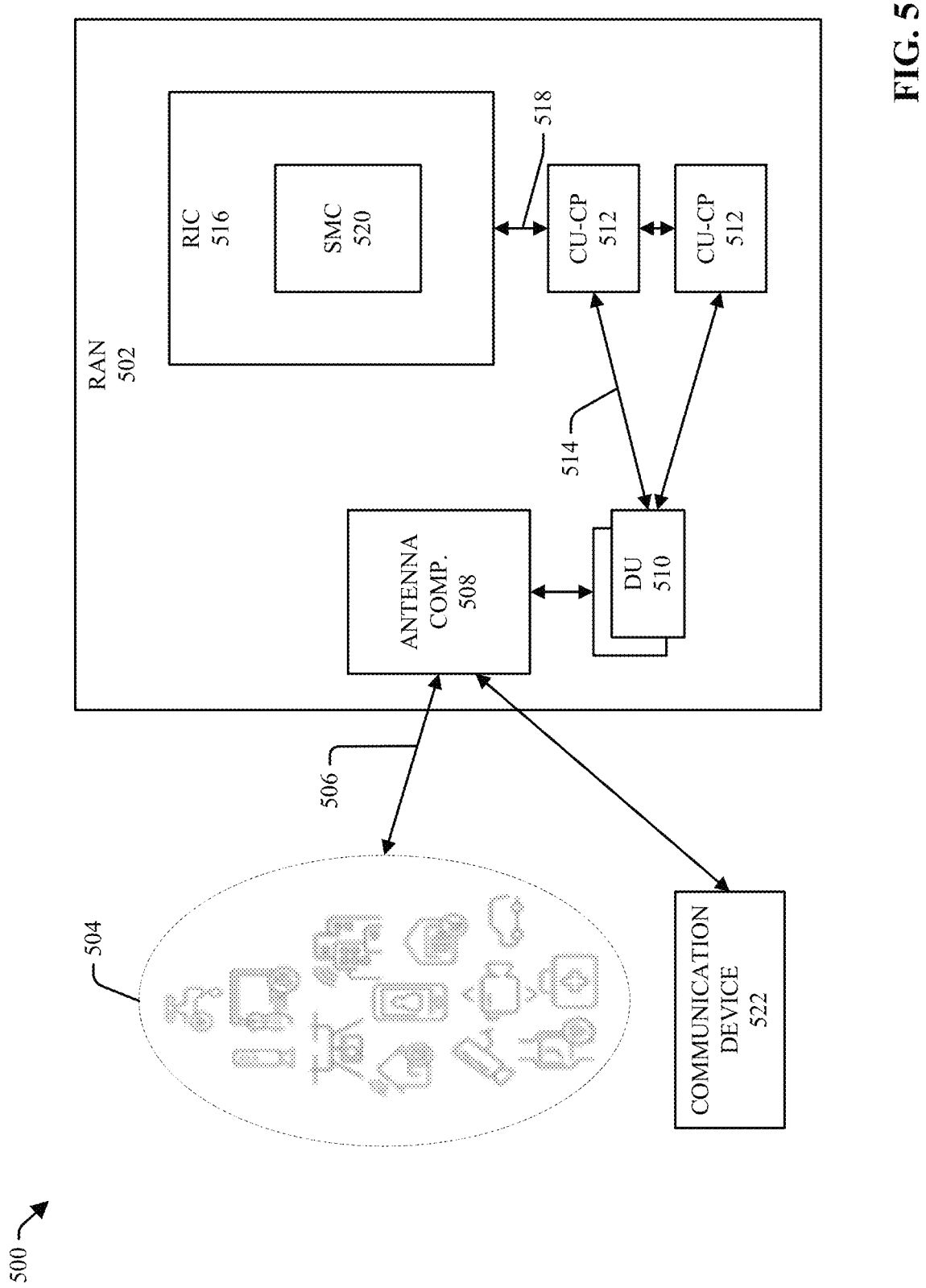
FIG. 5 depicts a diagram of an example system comprising a RAN to which communication devices, including Internet of Thing (IoT) devices, are attempting to connect, wherein the RAN comprises a security management component (SMC) that can detect and mitigate aggressive signaling and/or malicious events against the RAN and can manage connection of communication devices to the RAN, in accordance with various aspects and embodiments of the disclosed subject matter.

Referring to FIG. 5, FIG. 5 depicts a diagram of an example system 500 comprising a RAN to which communication devices, including IoT devices, are attempting to connect or are already connected, wherein the RAN comprises an SMC that can detect and mitigate aggressive signaling and/or malicious events against the RAN and can manage connection of communication devices to the RAN, in accordance with various aspects and embodiments of the disclosed subject matter. The system 500 can comprise a RAN 500 that can be part of a communication network (e.g., a mobility core network of a communication network). The RAN 502 can be the same as, or can comprise the same or similar functionality as, RANs, such as more fully described herein.

In an example instance, a plurality of communication devices 504, including IoT devices, can be attempting to connect (e.g., wirelessly connect) to the RAN 502 (or some of those devices may already be connected to the RAN 502) as part of aggressive signaling and/or a malicious event (e.g., malicious attack or signaling storm) by those communication devices 504 against the RAN 502. For instance, the plurality of communication devices 504 can be compromised communication devices (e.g., compromised massive IoT) that can be infected with malware. In some embodiments, each of the plurality of communication devices 504 can communicate respective attach requests or other communications to the RAN 502 via an air interface (depicted at reference numeral 506) associated with the RAN 502 to an antenna component 508 of the RAN 502. In some embodiments, the antenna component 508 can comprise a MIMO antenna array and radio unit to facilitate receiving of information by the RAN 502 and transmitting of information from the RAN 502.

The RAN 502 also can include a distributed unit (DU) component 510 that can comprise a DU function that can be associated with the radio unit and associated antenna component 508. The DU function in the 5G gNodeB/NR framework can comprise some of the functions that the base band unit (BBU) of 4G/LTE has.

The RAN 502 also can comprise a CU-CP component 512 that can employ a CU-CP function in the 5G gNodeB/NR framework. The CU-CP function can comprise certain functions (e.g., functions different from the DU function) that the BBU of 4g/LTE has. The DU component 510 can be associated with (e.g., communicatively connected to) the CU-CP component 512 via an F1-C interface 514 to facilitate data flows between the DU component 510 and the CU-CP component 512.

The RAN 502 further can comprise a RAN intelligent controller (RIC) 516 that can be associated with (e.g., communicatively connected to) the CU-CP component 512 via an E2 interface 518, wherein the E2 interface can facilitate data flows between the CU-CP component 512 and the RIC 516. The RIC 516 can manage various functions and resources of the RAN 502 in real time or substantially close (e.g., near) to real time.

The RAN 502 can comprise an SMC 520 that can detect and mitigate aggressive (e.g., excessive) signaling and/or malicious events by certain communication devices (e.g., plurality of communication devices 504) against the RAN 502, and desirably managing connections of communication devices to the RAN 502 during an aggressive signaling and/or malicious event to allow communication devices (e.g., communication device 522) that are not determined to be aggressive or malicious, and/or are associated with a higher priority, to connect to the RAN 502 and block (e.g., prevent or discontinue connections of) other communication devices (including the plurality of communication devices 504) determined to be acting in an aggressive (e.g., excessive signaling) and/or malicious manner from connecting to the RAN 502, in accordance with the defined network security criteria. In some embodiments, the SMC 520 can comprise and employ a security application (e.g., aggressive signaling, malicious event, and/or DDoS application) to facilitate detecting and mitigating aggressive signaling and/or malicious events against the RAN 502, and managing connections of communication devices to the RAN 502. The security application can be a micro services application (e.g., xApp), for example. The SMC 520 can provide an intelligent security capability using machine learning to enhance the detection and mitigation of aggressive signaling and/or malicious threats or events against the RAN 502 caused by certain communication devices (e.g., caused by signaling storms by means of massive IoT through the plurality of communication devices 504). The SMC 520 can be the same as, or can comprise the same or similar functionality as, the SMCs, as more fully described herein.

Figure 6:
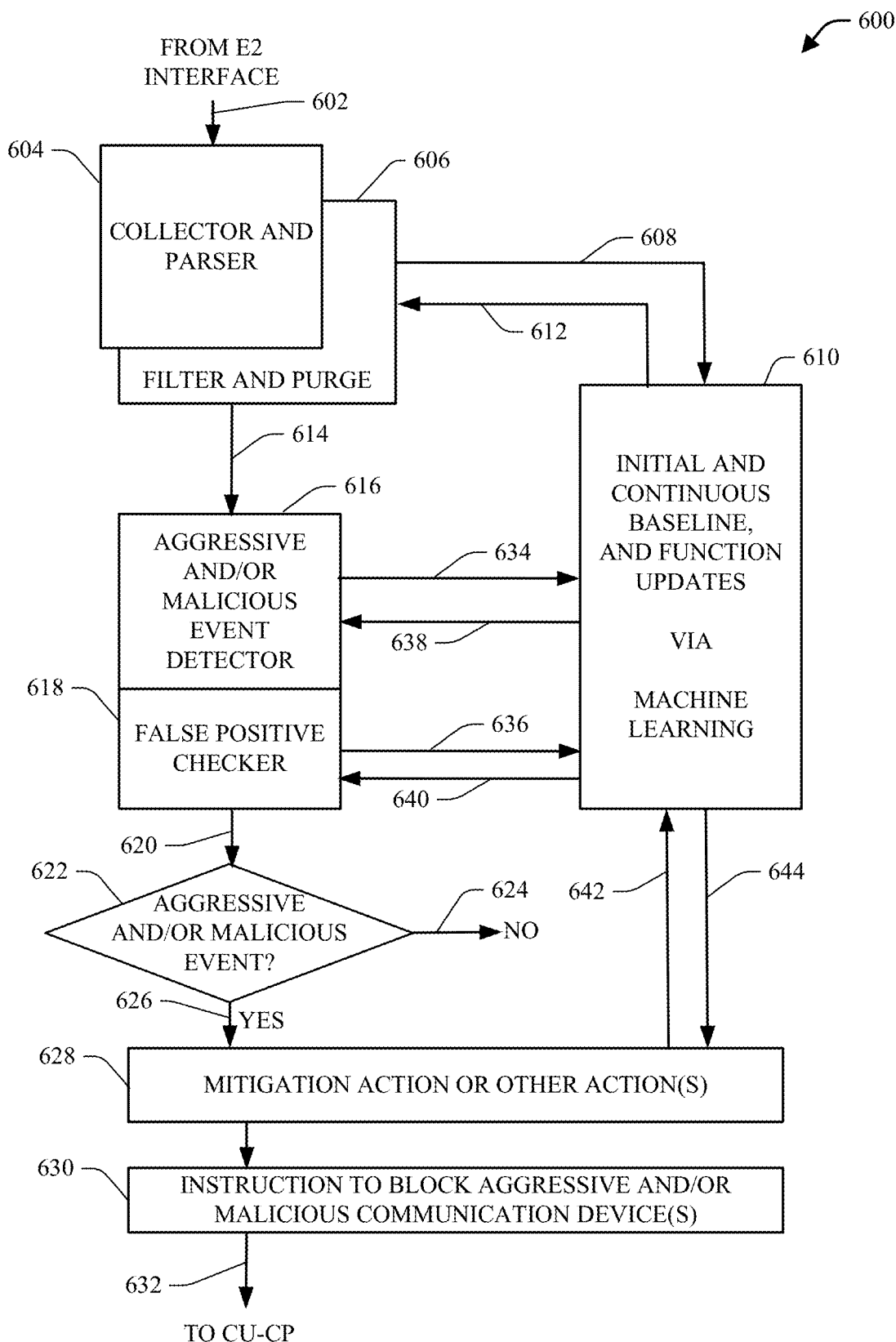
FIG. 6 depicts a block diagram of an example network security flow relating to various functions that can be performed by the SMC, in accordance with various aspects and embodiments of the disclosed subject matter.
Figure 7:
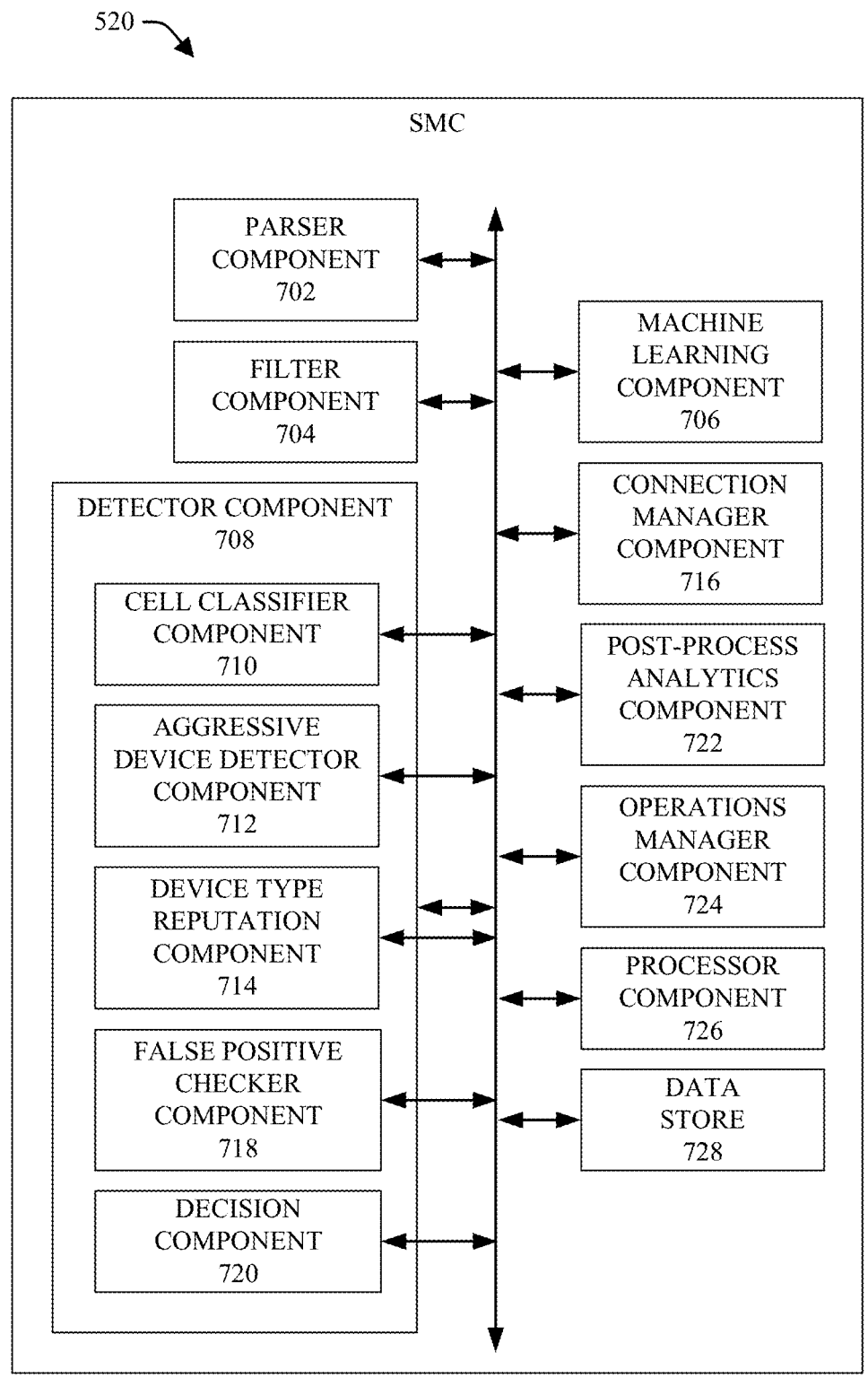
FIG. 7 illustrates a block diagram of an example SMC, in accordance with various aspects and embodiments of the disclosed subject matter.

Referring to FIGS. 6 and 7 (along with FIG. 5), FIG. 6 depicts a block diagram of an example network security flow 600 relating to various functions that can be performed by the SMC 520, and FIG. 7 illustrates a block diagram of the example SMC 520, including various components of the SMC 520, in accordance with various aspects and embodiments of the disclosed subject matter. As part of the example network security flow 600, information relating to communication devices attempting to connect to, or already connected to, the RAN 502 (e.g., communication devices submitting attach requests or other communications to the RAN 502) can be received by the RIC 516, and associated SMC 520, from the CU-CP component 512 via the E2 interface 518 (as depicted at reference numeral 602 of FIG. 6). The information, which can comprise real-time RAN-related data (e.g., 5G RAN data), can include, for example, attach request information relating to attach requests, other types of control signals, metadata, and/or other types of information relating to communication devices or associated messages, communicated to the RAN 502 by communication devices via the air interface 506 and antenna component 508. The communication devices can include, for example, communication device 522 and the plurality of communication devices 504.

The SMC 520 can comprise a parser component 702 that can collect and parse the information, including the information relating to communication devices (e.g., communication device 522 and plurality of communication devices 504) and/or associated messages, in real time or at least substantially real time (as depicted at reference numeral 604 of FIG. 6). The parser component 702 can analyze the information (e.g., attach request information, other types of control signals, metadata, or other types of information) relating to the communication devices and/or associated messages, and based at least in part on the results of such parsing analysis, the parser component 702 can determine or identify respective items of information in the information relating to the communication devices and/or associated messages. The parser component 702 can parse such information to facilitate determining relevant information from the information relating to the communication devices and/or associated messages.

In some embodiments, the SMC 520 also can include a filter component 704 that can be associated with (e.g., communicatively connected to) the parser component 702. The filter component 704 can filter (e.g., intelligently filter) the parsed information, can determine (e.g., intelligently determine) relevant information from the parsed information, filter the parsed information to generate filtered information comprising the relevant information, and purge other information of the parsed information that is determined to not be sufficiently relevant (as shown at reference numeral 606 of FIG. 6). The relevant information can comprise information determined to be relevant for use in determining whether an aggressive and/or malicious event against the RAN 502 by certain communication devices (e.g., plurality of communication devices 504) is occurring, in accordance with the defined network security criteria (e.g., network security criteria that can indicate what types of information can be relevant to determining aggressive and/or malicious events against the RAN 502). In some embodiments, the filter component 704 can filter the parsed information to generate the filtered information in real time or at least substantially in real time.

In certain embodiments, the filter component 704 can communicate the parsed information and/or other parsing and/or filtering-related information to a machine learning component 706 of the SMC 520 for analysis (e.g., machine learning analysis) (as indicated at reference numeral 608 of FIG. 6). The machine learning component 706 can employ machine learning techniques and algorithms to perform analysis on the parsed information and/or other parsing and/or filtering-related information to learn (e.g., continuously learn) how to improve the parsing and/or filtering (e.g., intelligent filtering) of information relating to communication devices and/or other RAN-related data to determine relevant information and facilitate detection of aggressive and/or malicious events against the RAN 502 (as indicated at reference numeral 610). For instance, based at least in part on the results of the analysis (e.g., machine learning analysis) of the parsed information, the other parsing and/or filtering-related information, and/or historical (e.g., previous) parsed information and/or other historical parsing and/or filtering-related information, the machine learning component 706 can learn (e.g., learn in real time, and/or learn over time) what types of information can be more relevant, and what other types of information can be relatively less relevant, to determinations regarding whether an aggressive and/or malicious event by communication devices (e.g., plurality of communication devices 504) is occurring.

For instance, the machine learning component 706 can employ the machine learning techniques and algorithms to learn how to enhance parsing and filtering of information relating communication devices to facilitate determining relevant information from the information relating communication devices and/or associated messages, filtering the information to generate the filtered information, comprising the relevant information, and purging undesired information (e.g., information determined to not be sufficiently relevant), in accordance with the defined network security criteria. Based at least in part on the results of such analysis and learning by the machine learning component 706, the machine learning component 706 can determine parsing and/or filtering update information (e.g., feedback information) relating to such enhancement of the parsing and filtering of the information relating communication devices and/or associated messages.

The machine learning component 706 can communicate the parsing and/or filtering update information to the parser component 702 and/or filter component 704 (as shown at reference numeral 612 of FIG. 6). The parser component 702 can utilize the parsing update information to update and enhance the parsing functions of the parser component 702. The filter component 704 can utilize the filtering update information to update and enhance the filtering functions of the filter component 704.

For instance, an update of the filtering functions of the filter component 704 can enhance determinations regarding which types of information associated with communication devices are relevant, or more relevant (e.g., more relevant than other types of information), when determining whether an aggressive and/or malicious event against the RAN 502 is occurring. For example, at a first time, it can be determined that a particular type of information is not particularly relevant to determining whether a malicious event against the RAN 502 is occurring, and therefore, the filtering criteria utilized by the filter component 704 can result in that particular type of information not being included in the filtered or relevant information. Based at least in part on analysis results of analyzing information relating to communication devices, the parsed information, and/or other desired information, the machine learning component 706 can learn that the particular type of information actually does have sufficient relevance to determining whether an aggressive and/or malicious event against the RAN 502 is occurring. Accordingly, the machine learning component 706 can generate filtering update information that can indicate that the particular type of information is relevant to determining whether an aggressive and/or malicious event against the RAN 502 is occurring, and the filtering functions of the filter component 704 can be updated, based at least in part on such filtering update information, such that the filter component 704, when subsequently analyzing and filtering parsed information, can determine that the particular type of information (if in the parsed information) can be relevant and can include it in the filtered (e.g., relevant) information generated by the filter component 704 and sent to the detector component 708 of the SMC 520.

In some embodiments, the machine learning component 706 also can determine an initial or continuous (e.g., adapted) baseline (e.g., a defined baseline), based at least in part on the results of the analysis of the parsed information and/or other parsing and/or filtering-related information, previous analysis of historical (e.g., previous) parsed information and/or other parsing and/or filtering-related information, and/or other desired information (as indicated at reference numeral 610 of FIG. 6). The other desired information can comprise, for example, information relating to aggressive and/or malicious event determinations made by and received from the detector component 708. The defined baseline (e.g., initial or continuous baseline) can be utilized by the detector component 708 to facilitate detecting or determining whether an aggressive and/or malicious event (e.g., excessive or aggressive signaling) against the RAN 502 by certain communication devices (e.g., plurality of communication devices 504) is occurring or at least potentially is occurring, as more fully described herein. The defined baseline can specify respective baseline parameters (e.g., respective threshold parameter values) regarding respective characteristics associated with the communication devices. If all or a sufficient number of the respective baseline parameters are determined to be satisfied (e.g., met or exceeded, or breached), for example, by the detector component 708, a determination can be made that an aggressive and/or malicious event against the RAN 502 by certain communication devices (e.g., plurality of communication devices 504) is occurring or at least potentially is occurring, in accordance with the defined network security criteria.

In certain embodiments, the machine learning component 706 can apply respective weights to the respective baseline parameters of the defined baseline, based at least in part the determined respective significance of the respective baseline parameters, in accordance with the defined network security criteria. For example, the machine learning component 706 can determine that a first baseline parameter can be more relevant or significant in determining whether a malicious event against the RAN 502 is occurring than a second baseline parameter, and accordingly, the machine learning component 706 can apply a first weight (e.g., a higher weight) to the first baseline parameter and a second weight (e.g., a relatively lower weight) to the second baseline parameter. The baseline parameters of the defined baseline can comprise various types of parameters (e.g., communication condition parameters associated with communication devices, configuration parameters associated with communication devices, location of cell or base station, terrain or geography associated with a cell or base station, locations of communication devices, type of attach request or other communication, time of attach request or other communication, number of communication devices in a given area, type of communication device, vendor or model of communication device, and/or another desired parameter or factor), such as those parameters described herein or any other desired type of parameter.

The machine learning component 706 can learn, based at least in part on continued analysis of parsed information, other parsing and/or filtering-related information, aggressive and/or malicious event determination-related information, external information relating to aggressive and/or malicious event determinations, and/or other desired information, enhancements that can be made to the defined baseline, including respective baseline parameters, to enhance the detection of aggressive and/or malicious events against the RAN 502. Based at least in part on such learning and enhancements, the machine learning component 706 can modify (e.g., adapt, adjust, change, or update) the defined baseline to generate an updated defined baseline (or update information that can be used to update the defined baseline), in accordance with the defined network security criteria.

Referring again to the filter component 704, the filter component 704 can communicate the filtered information, comprising the relevant information, associated with the communication devices (e.g., communication device 522, plurality of communication devices 504, or other communication devices) to the detector component 708 for analysis by the detector component 708 (as depicted at reference numeral 614 of FIG. 6). The detector component 708 can detect or determine aggressive and/or malicious events (e.g., excessive signaling and/or other aggressive or malicious attacks) by certain communication devices (e.g., plurality of communication devices 504) against the RAN 502 (e.g., during a DDoS attack by massive IoT against the RAN 502), based at least in part on the defined baseline (e.g., initial baseline or updated defined baseline, as applicable) and detection algorithms (as indicated at reference numeral 616 of FIG. 6).

The detector component 708 can comprise a cell classifier component 710 that can classify cells or associated base stations based at least in part on a set of factors, such as, for example, the activity level associated with a cell, location of the cell, terrain and/or geography of the cell site of the cell, and/or other desired factors. In some embodiments, the machine learning component 706 can be employed and trained, using machine learning techniques and algorithms, to classify or facilitate classifying cells and associated base stations, and can provide update information to the cell classifier component 710 to update and refine the ability of the cell classifier component 710 to more desirably (e.g., accurately, suitably, and/or efficiently) classify cells and/or associated base stations. For instance, the cell classifier component 710 and/or machine learning component 706, using the machine learning techniques and algorithms, can determine and build a profile for each cell (and/or associated base station) of the core network, wherein the profile can comprise information relating to various parameters, such as, for example, volume of connectivity and mobility events, signal power, signal quality, and behavior associated with the cell during various different times of the day, the week, the month, the year, and/or with regard to special events (e.g., holidays, sporting events, entertainment events, or other special events). These parameters can vary for different cells, for example, based at least in part on whether a cell site of a cell is located in a metropolitan area or a rural area, the terrain and/or geography of the cell site of the cell, and/or other factors.

The detector component 708 also can comprise an aggressive device detector component 712 that can detect aggressive and/or malicious communication devices (e.g., excessive signaling communication devices) acting against the RAN 502 (e.g., a cell or base station of the RAN 502), based at least in part on the result of analyzing the filtered information, applicable defined threshold values relating to control signals, and/or other desired information, wherein the applicable defined threshold values relating to control signals can be determined based at least in part on the defined baseline (initial or updated baseline), in accordance with the defined communication management criteria, which can comprise the defined network security criteria. The aggressive device detector component 712 can receive input information (e.g., filtered input information) from the cell classifier component 710 and, when available, from the device type reputation component 714, such as more fully described herein.

The applicable defined threshold values relating to control signals can comprise, for example, an applicable defined threshold total number of control signals that can be associated with a cell or associated base station, and can indicate whether there is unusual and/or potentially aggressive activity by communication devices associated with the cell or base station, such as more fully described herein. The defined threshold total number of control signals that can be applicable at the time of such analysis can be based at least in part on a number of factors, which can include the classification of the cell or associated base station, the type of control signal, whether one type or more than one type of control signal is being considered, the length of the defined time period, the time of day, time of week, time or month, or time of year when such analysis is being performed, and/or other desired factors. The applicable defined threshold values relating to control signals also can comprise, for example, an applicable defined threshold number of control signals that can be applied with regard to a communication device (e.g., identified communication device) associated with the cell or base station, and can indicate whether there is unusual and/or potentially aggressive activity (e.g., excessive signaling) by that communication device, such as more fully described herein.

Employing the detection techniques and algorithms, the detector component 708 (e.g., employing the aggressive device detector component 712) can analyze the filtered information, comprising the relevant information, relating to the communication devices and/or associated messages (e.g., control signals), in relation to the defined baseline (e.g., and associated defined threshold values relating to control signals), to facilitate determining whether an aggressive and/or malicious event (e.g., aggressive and/or malicious attack) against the RAN 502 by at least some of the communication devices (e.g., plurality of communication devices 504) is occurring. For instance, the detector component 708 can analyze the filtered information to determine respective characteristics (e.g., communication of control signals, communication conditions, configuration parameters, and/or device reputation characteristics) associated with the respective communication devices (e.g., communication device 522 and plurality of communication devices 504), wherein the respective characteristics associated with the respective communication devices can be utilized to facilitate determining whether there is an aggressive and/or malicious event against the RAN 502 occurring. As part of the analysis, the detector component 708 can compare respective parameters (e.g., parameter values) of the respective characteristics against corresponding baseline parameters of the defined baseline to determine whether the defined baseline has been satisfied (e.g., met or exceeded, or breached), which, if satisfied, can indicate that an aggressive and/or malicious event against the RAN 502 is occurring.

In certain embodiments, the defined baseline can comprise one or more threshold parameter values associated with one or more baseline parameters of one or more characteristics associated with communication devices. If a parameter value of a characteristic of the respective characteristics associated with the communication devices satisfies (e.g., meets or exceeds (or is lower than, as applicable), or breaches) the applicable threshold parameter value, the detector component 708 can determine that such satisfaction of the applicable threshold parameter value can be indicative of an aggressive and/or malicious event against the RAN 502 occurring.

Based at least in part on the results of such analysis, including the results of such comparison of respective parameters of the respective characteristics to corresponding baseline parameters of the defined baseline, the detector component 708 can determine whether the defined baseline has been satisfied (e.g., met or exceeded, or breached), and accordingly, can determine (e.g., can make at least a preliminary or initial determination) whether an aggressive and/or malicious event against the RAN 502 by at least some of the communication devices (e.g., all or some of the plurality of communication devices 504) is occurring.

For instance, if, based at least in part on the comparison results from the comparison of respective parameters of the respective characteristics to the defined baseline, the detector component 708 determines that the defined baseline is satisfied and there is sufficient evidence of an aggressive and/or malicious event against the RAN 502 occurring (e.g., due to certain parameter values of certain parameters associated with certain characteristics satisfying their respective defined threshold parameter values), the detector component 708 can determine (e.g., can make a preliminary or initial determination) that an aggressive and/or malicious event against the RAN 502 by at least some of the communication devices (e.g., some or all of the plurality of communication devices 504) is occurring, in accordance with the defined network security criteria. Alternatively, if, based at least in part on the comparison results from the comparison to the defined baseline, the detector component 708 determines that the defined baseline is not satisfied and there is not sufficient evidence of an aggressive and/or malicious event against the RAN 502 occurring (e.g., due to a lack of certain parameter values of certain parameters associated with certain characteristics satisfying their respective defined threshold parameter values), the detector component 708 can determine (e.g., can make a preliminary or initial determination) that there is no aggressive or malicious event against the RAN 502 occurring, in accordance with the defined network security criteria.

If the detector component 708 determines that no aggressive or malicious event against the RAN 502 occurring, the detector component 708 can communicate information indicating no aggressive or malicious event is occurring to a connection manager component 716 of the SMC 520. Accordingly, in response to receiving the information indicating that no malicious event is occurring, the connection manager component 716 can allow the communication devices to connect to or remain connected to the RAN 502. The SMC 520 can continue to monitor the communication network, including the RAN 502 and communication devices attempting to connect to, or already connected to, the RAN 502.

If, instead, the detector component 708 determines (e.g., makes a preliminary or initial determination) that an aggressive and/or malicious event against the RAN 502 by at least some of the communication devices (e.g., some or all of the plurality of communication devices 504) is occurring, the detector component 708 can employ a false positive checker component 718 to determine whether or not such determination of an aggressive and/or malicious event against the RAN 502 is a false positive indication of an aggressive and/or malicious event against the RAN 502 (as indicated at reference numeral 618 of FIG. 6).

The false positive checker component 718 can perform additional analysis (e.g., deeper or more detailed analysis) on the information relating the communication devices and/or associated messages (e.g., the filtered information comprising the relevant information, including information relating to communication of control signals), including the respective characteristics associated with the respective communication devices. In accordance with various embodiments, the additional analysis performed by the false positive checker component 718 can comprise information relating to respective configuration parameters associated with respective communication devices and/or, when available, respective device reputation information associated with respective communication devices, as more fully described herein. Based at least in part on the results of such analysis, the false positive checker component 718 can determine whether or not such determination of an aggressive and/or malicious event against the RAN 502 is a false positive indication of an aggressive and/or malicious event against the RAN 502. In some embodiments, the functions of the false positive checker component 718 can be enhanced based at least in part on feedback information (e.g., false positive checker update information) received from the machine learning component 706, as more fully described herein. As a result, the false positive checker component 718, including its false positive checking functions, can continue to be improved to enhance determinations, by the false positive checker component 718, regarding whether or not a determination of an aggressive and/or malicious event against the RAN 502 is a false positive indication of an aggressive and/or malicious event against the RAN 502.

If the false positive checker component 718 determines that the preliminary determination of an aggressive and/or malicious event against the RAN 502 (e.g., by the detector component 708) is a false positive, the false positive checker component 718 can communicate information relating to (e.g., indicating) the false positive determination to a decision component 720 of the detector component 708 (as depicted at reference numeral 620 of FIG. 6). The decision component 720 can determine or decide whether the aggressive and/or malicious event against the RAN 502 is occurring based at least in part on the information received from the false positive checker component 718 (as indicated at reference numeral 622 of FIG. 6.) Based at least in part on the information relating to the false positive determination, the decision component 720 can determine that no aggressive and/or malicious event against the RAN 502 is occurring (as indicated at reference numeral 624 of FIG. 6).

As a result, the detector component 708 can communicate information indicating no aggressive and/or malicious event against the RAN 502 is occurring to the connection manager component 716. In response to receiving the information indicating that no aggressive and/or malicious event against the RAN 502 is occurring, the connection manager component 716 can allow the communication devices to connect to the RAN 502. At this point, the SMC 520 can continue to monitor the communication network, including the RAN 502 and communication devices attempting to connect to, or already connected to, the RAN 502.

Alternatively, if the false positive checker component 718 determines that the preliminary determination of an aggressive and/or malicious event against the RAN 502 is not a false positive, the false positive checker component 718 can communicate information relating to (e.g., indicating) the non-false positive determination to the decision component 720 (as depicted at reference numeral 620 of FIG. 6). For instance, based at least in part on the information relating to the non-false positive determination, the decision component 720 can determine that the preliminary determination of an aggressive and/or malicious event against the RAN 502 occurring is not a false positive, and can determine that there is an aggressive and/or malicious event against the RAN 502 by at least some of the communication devices (e.g., some or all of the plurality of communication device 504) occurring (as depicted at reference numeral 626 of FIG. 6).

In response to determining that there is an aggressive and/or malicious event against the RAN 502 occurring, the decision component 720 can communicate information indicating that the aggressive and/or malicious event against the RAN 502 is occurring (as depicted at reference numeral 626 of FIG. 6), wherein the detector component 708 or filter component 704 can communicate the filtered information, comprising the relevant information, to the connection manager component 716 to enable the connection manager component 716 to determine whether to block or allow respective communication devices to connect to the RAN 502, or whether the SMC 520 is to perform another type of action besides or in addition to blocking or disconnecting communication devices by or from the RAN 502. With regard to the communication devices (e.g., communication device 522, plurality of communication devices 504, or other communication devices) attempting to connect to the RAN 502 or already connected to the RAN 502 during the aggressive and/or malicious event, the SMC 520 (e.g., employing the connection manager component 716) can determine whether to perform a mitigation action to block or disconnect the aggressive (e.g., excessive signaling) and/or malicious acting communication device(s) (e.g., some or all of the plurality of communication devices 504) or perform another action (e.g., alert action, log and learn action, or other desired action) to send an alert regarding the aggressive and/or malicious communication device(s), log and learn about the aggressive and/or malicious communication device(s) and associated activity, and/or perform another desired action, based at least in part on the results of an analysis of the information relating to the aggressive and/or malicious event (e.g., set of statistics and/or filtered information) received from the detector component 708 and/or filter component 704, such as more fully described herein (as depicted at reference numeral 628 of FIG. 6).

If a mitigation action to block or disconnect is to be performed, with regard to each communication device (e.g., a device of the plurality of communication devices 504) that is to be blocked from connecting to, or remaining connected to, the RAN 502, the connection manager component 716 can generate blocking instructions that can be utilized to facilitate blocking or discontinuing connection of the communication device to the RAN 502 (as indicated at reference numeral 630 of FIG. 6). The connection manager component 716 can communicate those blocking instructions to the CU-CP component 512 of the RAN 502 (as indicated at reference numeral 632 of FIG. 6). In response to the blocking instructions, the CU-CP component 512 can block or facilitate blocking the communication device from connecting to, or remaining connected to, the RAN 502.

Referring again to the machine learning component 706, in addition to enhancing parsing and filtering of information, as disclosed herein, the machine learning component 706 can employ machine learning techniques and algorithms to learn how to enhance (e.g., improve or optimize) determinations or detections of aggressive and/or malicious events against the RAN 502 by certain communication devices (e.g., communication devices infected with malware), enhance determinations of false positives of preliminary determinations of aggressive and/or malicious events against the RAN 502, and enhance determining, identifying, or distinguishing between communication devices associated with aggressive and/or malicious activity (e.g., excessive signaling) and communication devices associated with benign of acceptable activity.

In some embodiments, the detector component 708, including the false positive checker component 718, can communicate the aggressive and/or malicious event determination and/or false positive determination-related information relating to the aggressive and/or malicious event determinations and/or false positive determinations and/or the other desired information to the machine learning component 706 for analysis (as indicated at reference numerals 634 and 636 of FIG. 6). The aggressive and/or malicious event determination and/or false positive determination-related information can comprise the respective information (e.g., relevant information) analyzed by the detector component 708 and/or false positive checker component 718 in connection with rendering their respective determinations regarding aggressive and/or malicious events, information relating to the aggressive and/or malicious event determination criteria employed by the detector component 708, and/or information relating to the false positive determination criteria employed by the false positive checker component 718. The other desired information that can received by the machine learning component 706 can comprise, for example, the parsing and/or filtering-related information received from the parser component 702 and/or filter component 704, as disclosed herein, and/or other desired information (e.g., the set of statistics and/or information that can be relevant to cell classification or detection of aggressive and/or malicious activity by communication devices).

The machine learning component 706, employing the machine learning techniques and algorithms, can perform machine learning analysis on the aggressive and/or malicious event determination and/or false positive determination information, the parsing and/or filtering-related information, historical (e.g., previous) aggressive and/or malicious event determination, historical false positive determination information, historical parsing and/or filtering-related information, and/or other desired information (e.g., the set of statistics, information that can be relevant to cell classification or detection of aggressive and/or malicious activity by communication devices, and/or external information received from external data sources). Based at least in part on the results of such analysis, the machine learning component 706 can determine the aggressive and/or malicious event determination update information that can be used to update the detector component 708 and/or false positive determination update information that can be used to update the false positive checker component 718 to enhance detection or determination of aggressive and/or malicious events against the RAN 502 and/or determination of whether a preliminary determination of an aggressive and/or malicious event against the RAN 502 is a false positive or not, respectively, in accordance with the defined network security criteria.

For example, based at least in part on the results of such analysis, the machine learning component 706, employing the machine learning techniques and algorithms, can learn how to enhance (e.g., improve or optimize) detection or determination of aggressive and/or malicious events against the RAN 502 and/or determination of whether a preliminary determination of an aggressive and/or malicious event against the RAN 502 is a false positive or not, in accordance with the defined network security criteria. For instance, the machine learning component 706 can learn which characteristics or groups of characteristics associated with communication devices and/or parameter values of such characteristics can be more relevant or determinative on the issue of whether there is an aggressive and/or malicious event against the RAN 502 occurring and/or the issue of whether a preliminary determination of an aggressive and/or malicious event against the RAN 502 is a false positive or not. The machine learning component 706 also can learn respective defined threshold parameter values associated with respective baseline parameters of respective characteristics associated with communication devices that can improve determinations regarding whether an aggressive and/or malicious event against the RAN 502 is occurring and improve determinations regarding whether a preliminary determination of an aggressive and/or malicious event against the RAN 502 is a false positive or not.

Based at least in part on such learning, the machine learning component 706 can determine the aggressive and/or malicious event determination update information and/or false positive determination update information (e.g., feedback information) relating to such enhancement of the detection or determination of aggressive and/or malicious events against the RAN 502 and/or determination of whether a preliminary determination of an aggressive and/or malicious event against the RAN 502 is a false positive or not. The aggressive and/or malicious event determination update information can comprise or relate to modifications that can be made to the detector functions (e.g., aggressive and/or malicious event determination functions) of the detector component 708 to enhance detection or determination of aggressive and/or malicious events against the RAN 502, wherein such modifications can comprise or relate to modifications (e.g., adjustments, changes, or updates) to the types of characteristics or groups of characteristics associated with communication devices that are considered relevant or determinative for determining whether an aggressive and/or malicious event against the RAN 502 is occurring, modifications to respective defined threshold parameter values associated with respective baseline parameters of respective characteristics associated with communication devices and/or other modifications, and/or other modifications to the defined baseline to generate an updated defined baseline. The false positive determination update information can comprise or relate to modifications that can be made to the false positive determination functions of the false positive checker component 718 to enhance determinations regarding whether a preliminary determination of an aggressive and/or malicious event against the RAN 502 is a false positive or not, wherein such modifications can comprise or relate to modifications to the types of characteristics or groups of characteristics associated with communication devices that are considered relevant or determinative for determining whether an aggressive and/or malicious event against the RAN 502 is occurring (e.g., determining whether a preliminary determination of an aggressive and/or malicious event against the RAN 502 is a false positive or not), respective threshold parameter values to apply to parameters of respective characteristics associated with communication devices, modifications of conditions or events (and associated characteristics associated with communication devices and associated parameters values) that can be indicative or determinative of whether a preliminary determination of an aggressive and/or malicious event against the RAN 502 is a false positive or not, and/or other types of modifications.

The machine learning component 706 can communicate the aggressive and/or malicious event determination update information to the detector component 708 (as depicted at reference numeral 638 of FIG. 6) and/or the false positive determination update information to the false positive checker component 718 (as indicated at reference numeral 640 of FIG. 6). The SMC 520 (e.g., the detector component 708 or other component of the SMC 520) can modify the detector functions (e.g., aggressive and/or malicious event determination functions) of the detector component 708, based at least in part on the aggressive and/or malicious event determination update information, to enhance the detection or determination of aggressive and/or malicious events against the RAN 502. The SMC 520 (e.g., the false positive checker component 718 or other component of the SMC 520) can modify the aggressive and/or malicious event determination functions of the detector component 708, based at least in part on the false positive determination update information, to enhance determinations regarding whether a preliminary determination of an aggressive and/or malicious event against the RAN 502 is a false positive or not.

With further regard to the SMC 520 and connection manager component 716, the SMC 520 and/or the connection manager component 716 can communicate information relating to aggressive and/or malicious activity by communication devices, mitigation action related information, information related to other types of actions, and/or other desired (e.g., pertinent) information to the machine learning component 706 for machine learning analysis (as depicted at reference numeral 642 of FIG. 6). The machine learning component 706, employing the machine learning techniques and algorithms, can perform machine learning analysis on the aggressive and/or malicious activity by communication devices, mitigation action related information, information related to other types of actions, and/or other desired information, historical information relating thereto, the parsing and/or filtering-related information, the historical parsing and/or filtering-related information, the aggressive and/or malicious event determination information, the historical aggressive and/or malicious event determination, the false positive determination information, the historical false positive determination information, external information received from external data sources, and/or other desired information. Based at least in part on the results of such analysis, the machine learning component 706 can determine connection management update information that can be used to update the connection manager component 716 to enhance determinations regarding whether to block connections of communication devices or allow connections of communication devices to the RAN 502 during an aggressive and/or malicious event against the RAN 502.

For instance, the machine learning component 706 can employ machine learning techniques and algorithms to learn how to enhance (e.g., improve or optimize) determinations regarding whether to block or allow connections of communication devices to the RAN 502 during an aggressive and/or malicious event against the RAN 502, based at least in part on the result of the machine learning analysis, in accordance with the defined network security criteria. For example, the machine learning component 706 can learn modifications that can be made to the defined threshold priority level that is to be applied when determining whether aggressive activity (e.g., excessive signaling) associated with a communication device is sufficiently high (e.g., bad) enough to block the aggressive communication device from being connected to the RAN 502 (or whether other actions, such as alert action or log and learn action is to be taken instead) to enhance such connection management determinations and/or modifications that can be made to other connection management criteria or functions that can enhance the performance of connection management functions by the connection manager component 716.

Based at least in part on such learning, the machine learning component 706 can determine the connection management update information (e.g., feedback information) relating to such enhancement of the determinations regarding whether to block or allow connections of communication devices to the RAN 502 during an aggressive and/or malicious event against the RAN 502. The machine learning component 706 can communicate the connection management update information to the connection manager component 716 to facilitate updating the connection management functions of the connection manager component 716 (as indicated at reference numeral 644 of FIG. 6).

The SMC 520 (e.g., the connection manager component 716 or other component of the SMC 520) can modify the connection management functions of the connection manager component 716, based at least in part on the connection management update information, to enhance determinations relating to whether to perform mitigation actions to block communication devices from connecting or remaining connected to the RAN 502, determination of the defined threshold parameter value(s) to apply when making connection management determinations, determinations regarding whether a parameter value associated with communication devices satisfy the defined threshold parameter value(s), determinations regarding whether a communication device is to be permitted to connect to the RAN 502 (e.g., during an aggressive and/or malicious event against the RAN 502), and/or determinations regarding whether a communication device is to be blocked from connecting to the RAN 502 (e.g., during an aggressive and/or malicious event against the RAN 502).

In certain embodiments, the SMC 520 can include a post-process analytics component 722 that can perform post-process analytics relating to aggressive and/or malicious event determinations, connection management determinations, and/or other operations of the SMC 520, and/or can receive information relating to post-process analytics performed by another device or component (e.g., a communication device associated with the communication network) to facilitate enhancing performance of the SMC 520 with regard to making aggressive and/or malicious event determinations, determining which communication devices can be connected to the RAN 502 during an aggressive and/or malicious event, and/or otherwise enhancing performance of the SMC 520 (and the RAN 502). For instance, the post-process analytics component 722 (or the communication device that communicates the post-process analytics information to the post-process analytics component 722) can analyze information relating to aggressive and/or malicious event determinations to determine or facilitate determining whether a determination by the detector component 708 that an aggressive and/or malicious event against the RAN 502 occurred was a proper (e.g., correct or accurate) determination, determine or facilitate determining whether the detector component 708 failed to detect and classify an aggressive and/or malicious event against the RAN 502 that occurred, determine or facilitate determining whether the false positive checker component 718 incorrectly determined that an actual aggressive and/or malicious event against the RAN 502 was a false positive, and/or other desired types of analysis or determinations relating to aggressive and/or malicious events. Based at least in part on the results of such analysis, the post-process analytics component 722 (or the communication device that communicates the post-process analytics information to the post-process analytics component 722) can determine modifications that can be made to the detector component 708 (or other component(s) of the SMC 520, such as parser component 702 or filter component 704) to enhance (e.g., improve or optimize) determinations (e.g., preliminary determinations and/or false positive determinations) relating to malicious events against the RAN 502, and can generate post-process analytics information relating to such determination enhancements. The post-process analytics information can be utilized to modify the detector component 708 (or other component(s) of the SMC 520, such as parser component 702 or filter component 704) to enhance the performance of the detector component 708 (or the other component(s) of the SMC 520).

As another example, the post-process analytics component 722 (or the communication device that communicates the post-process analytics information to the post-process analytics component 722) can analyze information relating to connection management determinations to determine or facilitate determining whether a communication device, such as a benign acting communication device, was improperly blocked from connecting to the RAN 502 or was improperly disconnected from the RAN 502 during a mitigation action performed by the SMC 520 during an aggressive and/or malicious event against the RAN 502, or determine or facilitate determining whether an aggressive and/or malicious acting communication device was allowed to connect, or allowed to remain being connected, to the RAN 502 during a mitigation action performed by the SMC 520 during an aggressive and/or malicious event against the RAN 502. Based at least in part on the results of such analysis, the post-process analytics component 722 (or the communication device that communicates the post-process analytics information to the post-process analytics component 722) can determine modifications that can be made to the connection manager component 716 (or other component(s) of the SMC 520, such as parser component 702 or filter component 704) to enhance (e.g., improve or optimize) determinations relating to managing connections of communication devices during aggressive and/or malicious events against the RAN 502, and can generate post-process analytics information relating to such determination enhancements. The post-process analytics information can be utilized to modify the connection manager component 716 (or other component(s) of the SMC 520, such as parser component 702 or filter component 704) to enhance the performance of the connection manager component 716 (or the other component(s) of the SMC 520).

In some embodiments, the SMC 520 can comprise an operations manager component 724 that can control (e.g., manage) operations associated with the SMC 520. For example, the operations manager component 724 can facilitate generating instructions to have components of the SMC 520 perform operations, and can communicate respective instructions to respective components (e.g., parser component 702, filter component 704, machine learning component 706, detector component 708, connection manager component 716, or other component) of the SMC 520 to facilitate performance of operations by the respective components of the SMC 520 based at least in part on the instructions, in accordance with the defined communication management or network security criteria, and communication management or network security algorithms (e.g., parsing algorithms, filtering algorithms, machine learning algorithms, aggressive or malicious event detection algorithms, false positive determination algorithms, connection management algorithms, or other algorithm, as disclosed, defined, recited, or indicated herein by the methods, systems, and techniques described herein). The operations manager component 724 also can facilitate controlling data flow between the respective components of the SMC 520 and controlling data flow between the SMC 520 and another component(s) or device(s) (e.g., a communication device, a base station or other network component or device of the communication network, data sources, or applications) associated with (e.g., connected to) the SMC 520.

The SMC 520 also can include a processor component 726 that can work in conjunction with the other components (e.g., parser component 702, filter component 704, machine learning component 706, detector component 708, connection manager component 716, data store 728, or other component) to facilitate performing the various functions of the SMC 520. The processor component 726 can employ one or more processors, microprocessors, or controllers that can process data, such as information relating to communication devices, communication conditions associated with communication devices, configuration parameters associated with communication device, device reputation information associated with communication devices, cell or base station classification information, characteristics associated with communication devices or groups of communication devices, identifiers or authentication credentials associated with communication devices, network conditions, metadata, messages, data parsing, data filtering, aggressive or malicious events, aggressive or malicious event determinations, false positive determinations, connection management determinations, parameters, defined baselines, baseline parameters, threshold values associated with baseline parameters, traffic flows, policies, defined communication management criteria, defined network security criteria, algorithms (e.g., parsing algorithms, filtering algorithms, machine learning algorithms, aggressive or malicious event detection algorithms, false positive determination algorithms, connection management algorithms), protocols, interfaces, tools, and/or other information, to facilitate operation of the SMC 520, as more fully disclosed herein, and control data flow between the SMC 520 and other components (e.g., a communication device, a base station or other network component or device of the communication network, data sources, applications) associated with the SMC 520.

The data store 728 can store data structures (e.g., user data, metadata), code structure(s) (e.g., modules, objects, hashes, classes, procedures) or instructions, information relating to communication devices, communication conditions associated with communication devices, configuration parameters associated with communication device, device reputation information associated with communication devices, cell or base station classification information, characteristics associated with communication devices or groups of communication devices, identifiers or authentication credentials associated with communication devices, network conditions, metadata, messages, data parsing, data filtering, aggressive or malicious events, aggressive or malicious event determinations, false positive determinations, connection management determinations, parameters, defined baselines, baseline parameters, threshold values associated with baseline parameters, traffic flows, policies, defined communication management criteria, defined network security criteria, algorithms (e.g., parsing algorithms, filtering algorithms, machine learning algorithms, aggressive or malicious event detection algorithms, false positive determination algorithms, connection management algorithms), protocols, interfaces, tools, and/or other information, to facilitate controlling operations associated with the SMC 520. In an aspect, the processor component 726 can be functionally coupled (e.g., through a memory bus) to the data store 728 in order to store and retrieve information desired to operate and/or confer functionality, at least in part, to the parser component 702, filter component 704, machine learning component 706, detector component 708, connection manager component 716, post-process analytics component 722, operations manager component 724, and data store 728, or other component, and/or substantially any other operational aspects of the SMC 520.

Described herein are systems, methods, articles of manufacture, and other embodiments or implementations that can facilitate detecting and mitigating malicious events against a RAN of a communication network, and managing connection of communication devices to the RAN, as more fully described herein. The detecting and mitigating malicious events against a RAN of a communication network, and managing connection of communication devices to the RAN, and/or other features of the disclosed subject matter, can be implemented in connection with any type of device with a connection to, or attempting to connect to, the communication network (e.g., a wireless or mobile device, a computer, a handheld device, etc.), any Internet of things (IoT) device (e.g., health monitoring device, toaster, coffee maker, blinds, music players, speakers, etc.), and/or any connected vehicles (e.g., cars, airplanes, space rockets, and/or other at least partially automated vehicles (e.g., drones)). In some embodiments, the non-limiting term user equipment (UE) is used. It can refer to any type of wireless device that communicates with a radio network node in a cellular or mobile communication system. Examples of UE can be a target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles, etc. Note that the terms element, elements, and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller component that can control routing of traffic within the network and between the network and traffic destinations. The SDN controller component can be merged with the 5G network architecture to enable service deliveries via open Application Programming Interfaces (APIs) and move the network core towards an all Internet Protocol (IP), cloud based, and software driven telecommunications network. The SDN controller component can work with, or take the place of, Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 8:
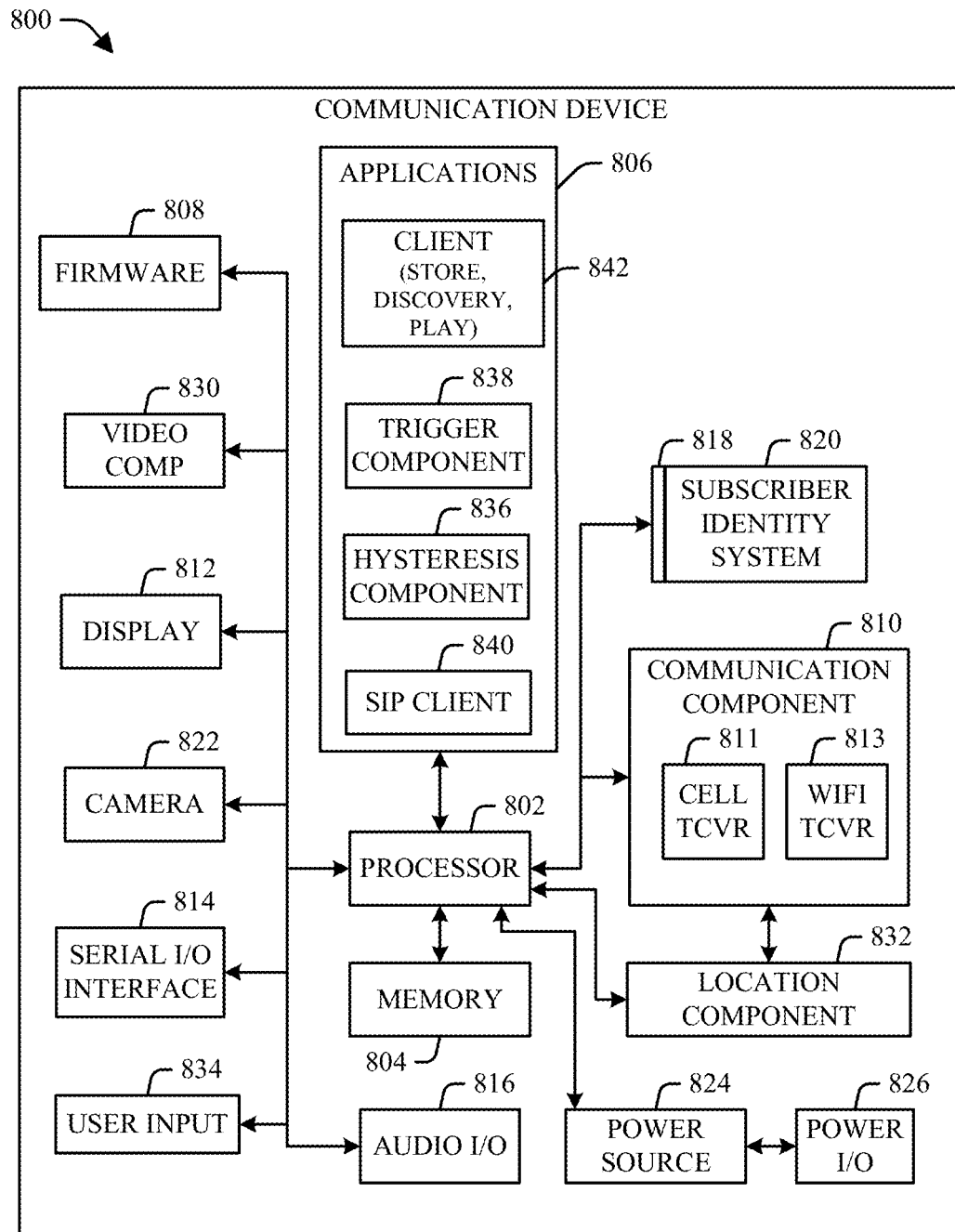
FIG. 8 depicts a block diagram of example communication device, in accordance with various aspects and embodiments of the disclosed subject matter.

Referring now to FIG. 8, depicted is an example block diagram of an example communication device 800 (e.g., wireless or mobile phone, electronic pad or tablet, electronic eyewear, electronic watch, or other electronic bodywear, or IoT device, . . . ) operable to engage in a system architecture that facilitates wireless communications according to one or more embodiments described herein. Although a communication device is illustrated herein, it will be understood that other devices can be a communication device, and that the communication device is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The communication device 800 can include a processor 802 for controlling and processing all onboard operations and functions. A memory 804 interfaces to the processor 802 for storage of data and one or more applications 806 (e.g., a video player software, user feedback component software, etc.). Other applications can include voice recognition of predetermined voice commands that facilitate initiation of the user feedback signals. The applications 806 can be stored in the memory 804 and/or in a firmware 808, and executed by the processor 802 from either or both the memory 804 or/and the firmware 808. The firmware 808 can also store startup code for execution in initializing the communication device 800. A communication component 810 interfaces to the processor 802 to facilitate wired/wireless communication with external systems, e.g., cellular networks, VoIP networks, and so on. Here, the communication component 810 can also include a suitable cellular transceiver 811 (e.g., a GSM transceiver) and/or an unlicensed transceiver 813 (e.g., Wi-Fi, WiMax) for corresponding signal communications. The communication device 800 can be a device such as a cellular telephone, a PDA with mobile communications capabilities, and messaging-centric devices. The communication component 810 also facilitates communications reception from terrestrial radio networks (e.g., broadcast), digital satellite radio networks, and Internet-based radio services networks.

The communication device 800 includes a display 812 for displaying text, images, video, telephony functions (e.g., a Caller ID function), setup functions, and for user input. For example, the display 812 can also be referred to as a "screen" that can accommodate the presentation of multimedia content (e.g., music metadata, messages, wallpaper, graphics, etc.). The display 812 can also display videos and can facilitate the generation, editing and sharing of video quotes. A serial I/O interface 814 is provided in communication with the processor 802 to facilitate wired and/or wireless serial communications (e.g., USB, and/or IEEE 1394) through a hardwire connection, and other serial input devices (e.g., a keyboard, keypad, and mouse). This supports updating and troubleshooting the communication device 800, for example. Audio capabilities are provided with an audio I/O component 816, which can include a speaker for the output of audio signals related to, for example, indication that the user pressed the proper key or key combination to initiate the user feedback signal. The audio I/O component 816 also facilitates the input of audio signals through a microphone to record data and/or telephony voice data, and for inputting voice signals for telephone conversations.

The communication device 800 can include a slot interface 818 for accommodating a SIC (Subscriber Identity Component) in the form factor of a card Subscriber Identity Module (SIM) or universal SIM 820, and interfacing the SIM card 820 with the processor 802. However, it is to be appreciated that the SIM card 820 can be manufactured into the communication device 800, and updated by downloading data and software.

The communication device 800 can process IP data traffic through the communication component 810 to accommodate IP traffic from an IP network such as, for example, the Internet, a corporate intranet, a home network, a person area network, etc., through an ISP or broadband cable provider. Thus, VoIP traffic can be utilized by the communication device 800 and IP-based multimedia content can be received in either an encoded or a decoded format.

A video processing component 822 (e.g., a camera) can be provided for decoding encoded multimedia content. The video processing component 822 can aid in facilitating the generation, editing, and sharing of video quotes. The communication device 800 also includes a power source 824 in the form of batteries and/or an AC power subsystem, which power source 824 can interface to an external power system or charging equipment (not shown) by a power I/O component 826.

The communication device 800 can also include a video component 830 for processing video content received and, for recording and transmitting video content. For example, the video component 830 can facilitate the generation, editing and sharing of video quotes. A location tracking component 832 facilitates geographically locating the communication device 800. As described hereinabove, this can occur when the user initiates the feedback signal automatically or manually. A user input component 834 facilitates the user initiating the quality feedback signal. The user input component 834 can also facilitate the generation, editing and sharing of video quotes. The user input component 834 can include such conventional input device technologies such as a keypad, keyboard, mouse, stylus pen, and/or touch screen, for example.

Referring again to the applications 806, a hysteresis component 836 facilitates the analysis and processing of hysteresis data, which is utilized to determine when to associate with the access point. A software trigger component 838 can be provided that facilitates triggering of the hysteresis component 836 when the Wi-Fi transceiver 813 detects the beacon of the access point. A SIP client 840 enables the communication device 800 to support SIP protocols and register the subscriber with the SIP registrar server. The applications 806 can also include a client 842 that provides at least the capability of discovery, play and store of multimedia content, for example, music.

The communication device 800, as indicated above related to the communication component 810, includes an indoor network radio transceiver 813 (e.g., Wi-Fi transceiver). This function supports the indoor radio link, such as IEEE 802.11, for the dual-mode GSM device (e.g., communication device 800). The communication device 800 can accommodate at least satellite radio services through a device (e.g., handset device) that can combine wireless voice and digital radio chipsets into a single device (e.g., single handheld device).

Figure 9:
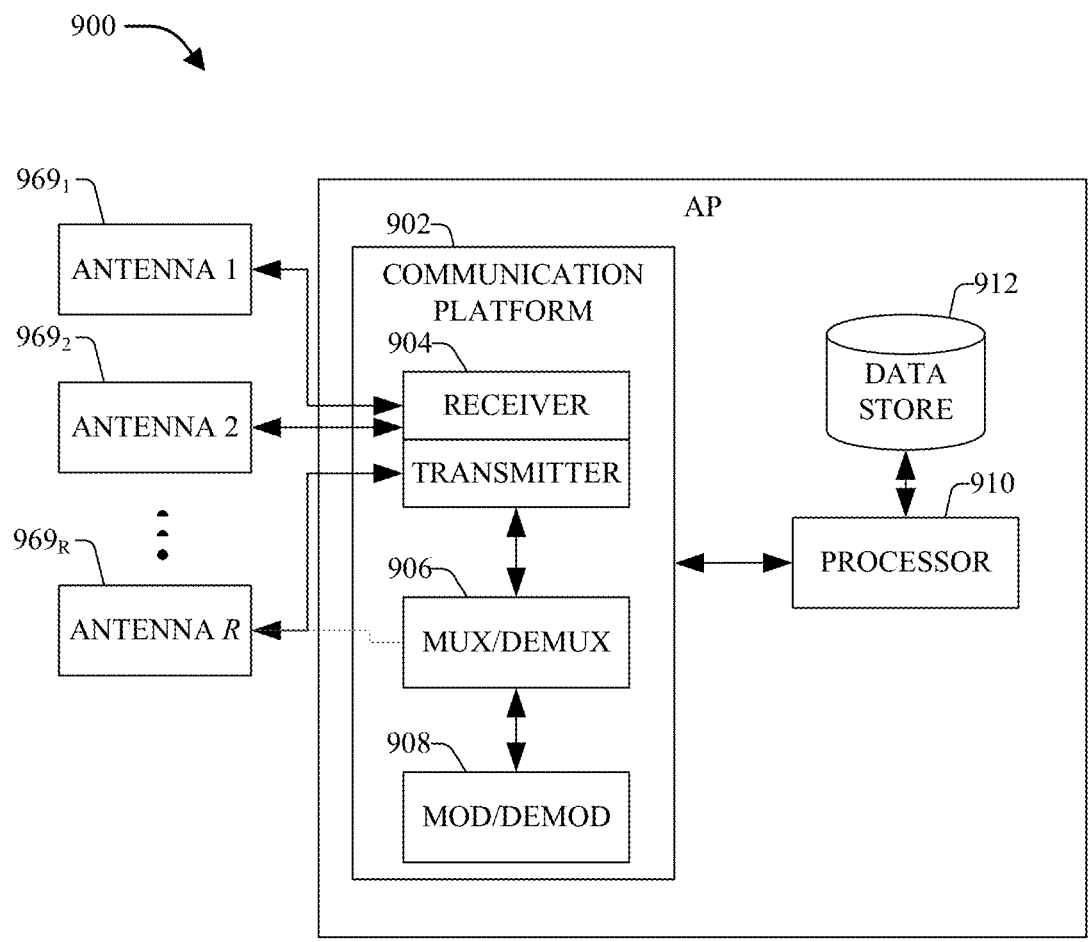
FIG. 9 illustrates a block diagram of an example access point, in accordance with various aspects and embodiments of the disclosed subject matter.

FIG. 9 illustrates a block diagram of an example AP 900 (e.g., macro base station, femto AP, pico AP, Wi-Fi AP, Wi-Fi-direct AP, or other type of AP), in accordance with various aspects and embodiments of the disclosed subject matter. The AP 900 can receive and transmit signal(s) from and to wireless devices like access points (e.g., base stations, femtocells, picocells, or other type of access point), access terminals (e.g., UEs), wireless ports and routers, and the like, through a set of antennas 9691-969R. In an aspect, the antennas 9691-969R are a part of a communication platform 902, which comprises electronic components and associated circuitry that can provide for processing and manipulation of received signal(s) and signal(s) to be transmitted. In an aspect, the communication platform 902 can include a receiver/transmitter 904 that can convert signal from analog to digital upon reception, and from digital to analog upon transmission. In addition, receiver/transmitter 904 can divide a single data stream into multiple, parallel data streams, or perform the reciprocal operation.

In an aspect, coupled to receiver/transmitter 904 can be a multiplexer/demultiplexer (mux/demux) 906 that can facilitate manipulation of signal in time and frequency space. The mux/demux 906 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 906 can scramble and spread information (e.g., codes) according to substantially any code known in the art, e.g., Hadamard-Walsh codes, Baker codes, Kasami codes, polyphase codes, and so on. A modulator/demodulator (mod/demod) 908 also can be part of the communication platform 902, and can modulate information according to multiple modulation techniques, such as frequency modulation, amplitude modulation (e.g., M-ary quadrature amplitude modulation (QAM), with M a positive integer), phase-shift keying (PSK), and the like.

The AP 900 also can comprise a processor(s) 910 that can be configured to confer and/or facilitate providing functionality, at least partially, to substantially any electronic component in or associated with the AP 900. For instance, the processor(s) 910 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc.

In another aspect, the AP 900 can include a data store 912 that can store data structures; code instructions; rate coding information; information relating to measurement of radio link quality or reception of information related thereto; information relating to communication conditions (e.g., SINR, implicit NACK rate, RSRP, RSRQ, CQI, and/or other wireless communications metrics or parameters) associated with communication devices, the group of parameters (e.g., resource block parameter, MCS parameter, packet repetition parameter, and/or other desired parameter), the respective threshold values associated with the respective parameters, ACK/NACK-related information (e.g., ACK/NACK status information), time-related information, metadata, communication devices, policies and rules, users, applications, services, communication management criteria, traffic flows, signaling, algorithms (e.g., communication management algorithm(s), mapping algorithm(s), . . . ), protocols, interfaces, tools, and/or other information, etc.; white list information, information relating to managing or maintaining the white list; system or device information like policies and specifications; code sequences for scrambling; spreading and pilot transmission; floor plan configuration; access point deployment and frequency plans; scheduling policies; and so on. The processor(s) 910 can be coupled to the data store 912 in order to store and retrieve information (e.g., information, such as algorithms, relating to multiplexing/demultiplexing or modulation/demodulation; information relating to radio link levels; information relating to communication conditions (e.g., SINR, implicit NACK rate, RSRP, RSRQ, CQI, and/or other wireless communications metrics or parameters) associated with communication devices, the group of parameters (e.g., resource block parameter, MCS parameter, packet repetition parameter, and/or other desired parameter), the respective threshold values associated with the respective parameters, ACK/NACK-related information (e.g., ACK/NACK status information), time-related information, metadata, communication devices, policies and rules, users, applications, services, communication management criteria, traffic flows, signaling, algorithms (e.g., communication management algorithm(s), mapping algorithm(s), . . . ), protocols, interfaces, tools, and/or other information, etc.; . . . ) desired to operate and/or confer functionality to the communication platform 902 and/or other operational components of AP 900.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 10:
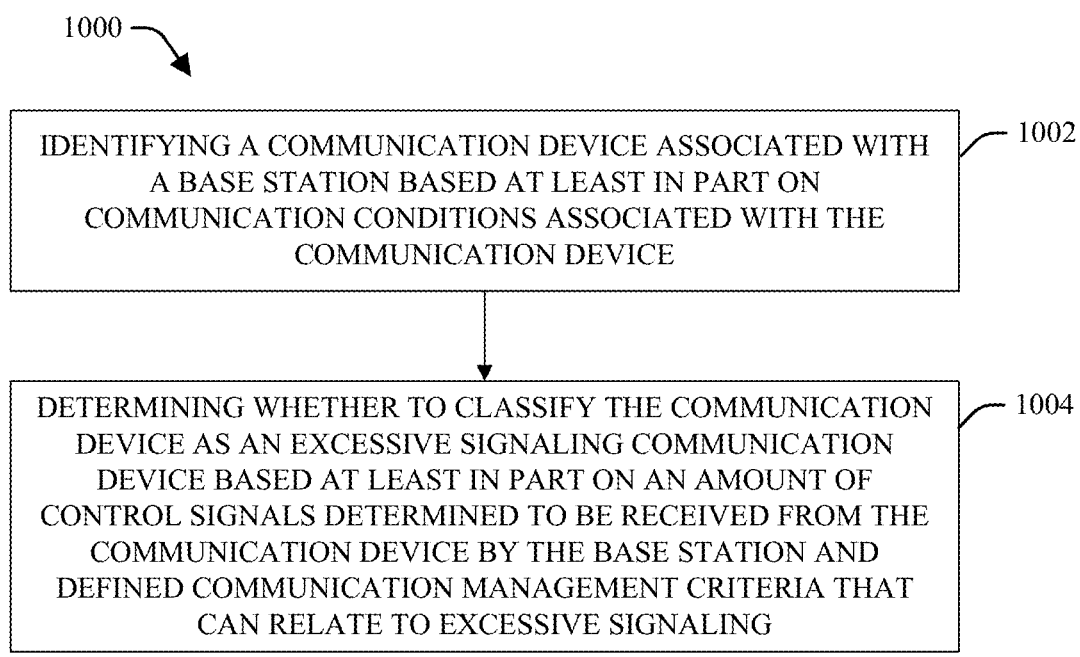
FIG. 10 illustrates a flow chart of an example method that can identify a communication device that is engaging in excessive signaling against a RAN of a communication network, in accordance with various aspects and embodiments of the disclosed subject matter.
Figure 11:
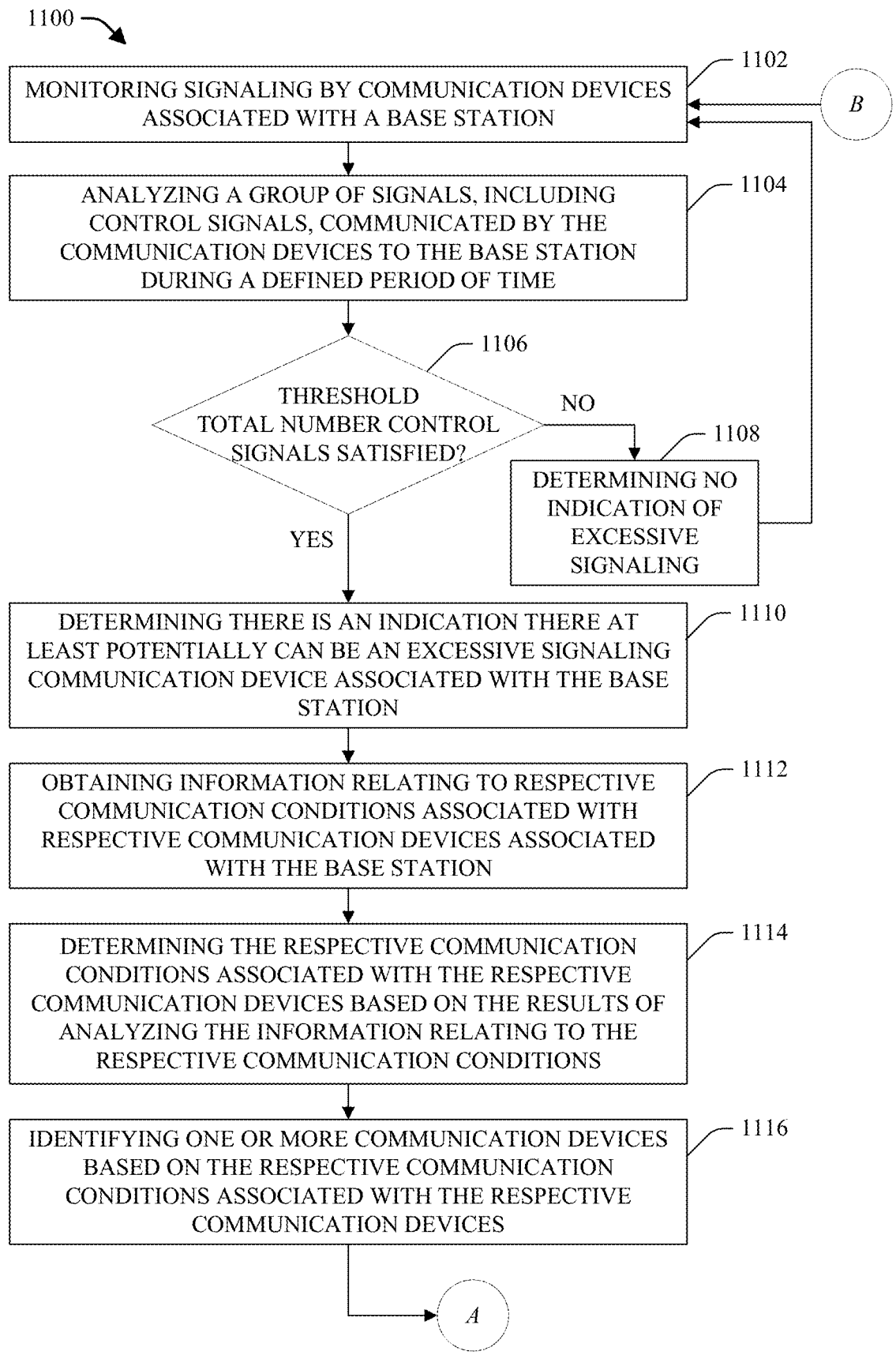
FIGS. 11 and 12 depict a flow chart of an example method that can identify a communication device that is engaging in excessive signaling against a RAN of a communication network and can manage connection of communication devices to the RAN, in accordance with various aspects and embodiments of the disclosed subject matter.
Figure 12:
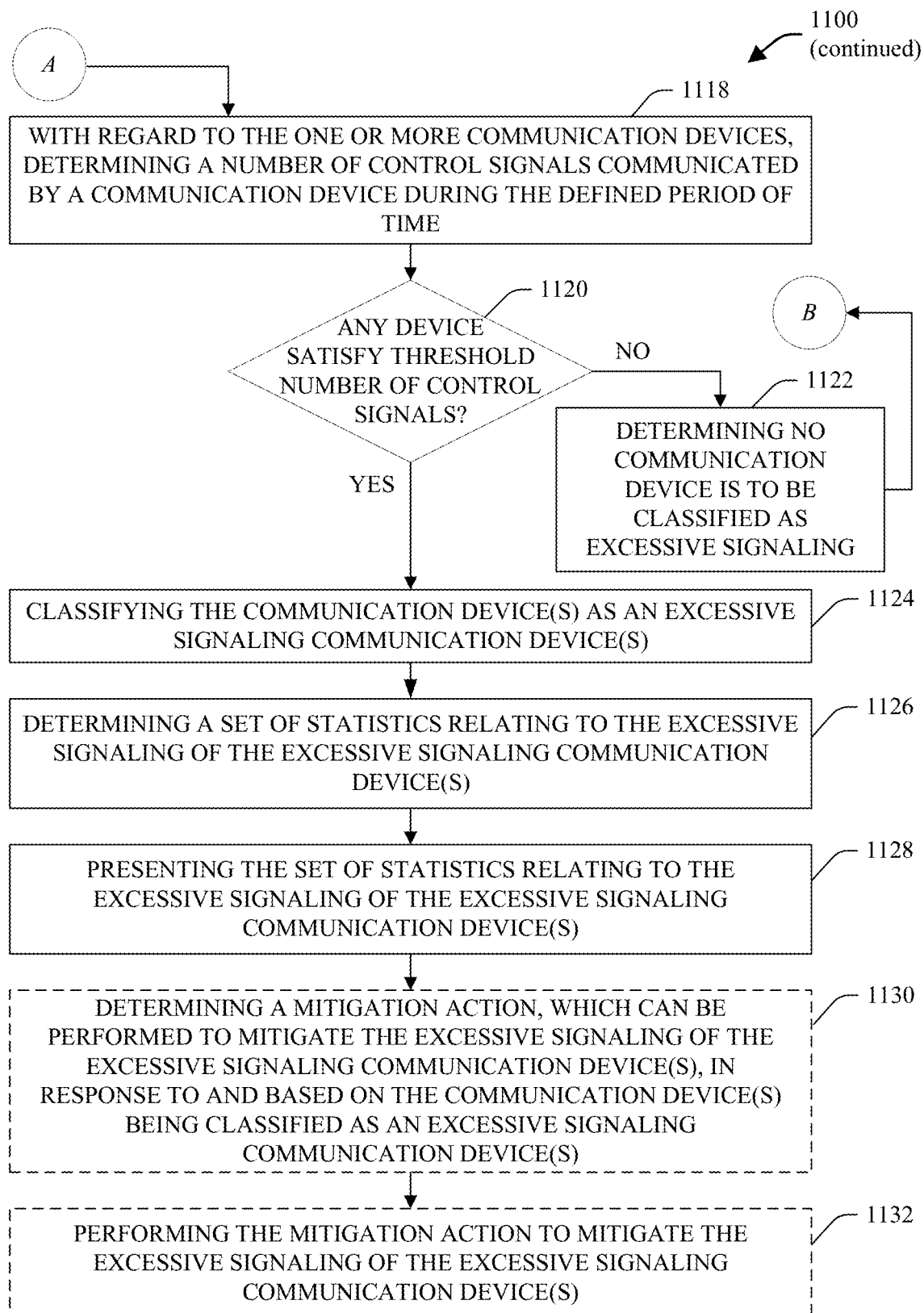

In view of the example systems and/or devices described herein, example methods that can be implemented in accordance with the disclosed subject matter can be further appreciated with reference to flowcharts in FIGS. 10-12. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 10 illustrates a flow chart of an example method 1000 that can identify a communication device that is engaging in excessive signaling against a RAN of a communication network, in accordance with various aspects and embodiments of the disclosed subject matter. The method 1000 can be employed by, for example, a system comprising the SMC, a processor component (e.g., of or associated with the SMC), and/or a data store (e.g., of or associated with the SMC).

At 1002, a communication device associated with a base station can be identified based at least in part on communication conditions associated with the communication device. The SMC can receive information relating to communication devices from the communication devices and/or from network devices associated with the RAN, wherein the communication devices can comprise the communication device. With regard to the communication device, the information can comprise information relating to communication conditions (e.g., signal strength, signal quality, timing advance, or other type of communication condition) associated with the communication device, information relating to control signals, including, for example, an initial attach request sent by the communication device attempting to connect to the RAN, an update attach request sent by a communication device that is already connected to the RAN and is requesting some type of update (e.g., updated information or updated connection), a connection request signal to request a connection to a base station of the RAN, a handover-related signal associated with a handover of the communication device to or from the base station, or other type of control signal, and/or other desired information relating to the communication device.

In some embodiments, the SMC (e.g., the detector component of the SMC) can desire to identify a communication device(s), for example, if the SMC has detected unusual activity (e.g., unusually high amount of control signals sent) by one or more communication devices associated with the base station (e.g., detected a total amount of control signals sent by communication devices associated with the base station that satisfies a defined threshold total amount of control signals), as more fully described herein. The detector component can utilize information relating to communication conditions associated with the communication devices to facilitate identifying a communication device(s) that is causing the unusual activity associated with the base station.

For instance, the detector component can analyze the information relating to the communication devices, such as the information relating to the communication conditions associated with the communication devices. Based at least in part on the results of the analysis of such information, the detector component can identify the communication device. For example, the detector component can identify a signature (e.g., communication signature) associated with the communication device, such as one or more communication condition values or ranges of communication condition values (e.g., range of signal strength values, range of signal quality values, or range of timing advance values) that can be associated with or representative of the communication device based at least in part on the results of analyzing the communication conditions associated with the communication device (e.g., relative to other communication conditions associated with other communication devices associated with the base station). The detector component can identify the communication device based at least in part on the signature associated with the communication device.

At 1004, a determination can be made regarding whether to classify the communication device as an excessive signaling communication device based at least in part on an amount of control signals determined to be received from the communication device by the base station and defined communication management criteria that can relate to excessive signaling. The detector component can determine whether to classify the communication device as an excessive signaling communication device based at least in part on the amount of control signals determined to be received from the communication device by the base station and the defined communication management criteria that can relate to excessive signaling (e.g., excessive control signaling). For instance, the defined communication management criteria can comprise or specify a defined threshold amount of control signals that can be utilized to indicate whether a communication device is an excessive signaling communication device. The detector component determine whether the amount of control signals determined to be received from the communication device by the base station satisfies (e.g., meets or exceeds) the defined threshold amount of control signals.

If the detector component determines that the amount of control signals associated with the communication device does not satisfy the defined threshold amount of control signals, the detector component can determine that the communication device is not an excessive signaling communication device. If, instead, the detector component determines that the amount of control signals associated with the communication device does satisfy the defined threshold amount of control signals, the detector component can determine that the communication device is an excessive signaling communication device.

If the communication device is determined to be an excessive signaling communication device, the SMC can determine a mitigation action that can be performed to mitigate or facilitate mitigating the excessive signaling of the communication device, or future excessive signaling of communication devices, and/or can determine a set of statistics (e.g., an exception level relating to the excessive signaling, trend statistics relating to the excessive signaling, statistics relating to communication of control signals, a confidence level associated with the excessive signaling determination or identification of the communication device, or another desired statistic) that can facilitate mitigating excessive signaling by communication devices, as more fully described herein. The SMC (or another component) can perform the mitigation action to mitigate or facilitate mitigating the excessive signaling of the communication device, or future excessive signaling of communication devices, and/or can communicate the set of statistics relating to the excessive signaling to another component or to a user via an interface of a device or a messaging account (e.g., email account, text message account, or voice mail account) associated with the user.

FIGS. 11 and 12 depict a flow chart of an example method 1100 that can identify a communication device that is engaging in excessive signaling against a RAN of a communication network and can manage connection of communication devices to the RAN, in accordance with various aspects and embodiments of the disclosed subject matter. The method 1100 can be employed by, for example, a system comprising the SMC, a processor component (e.g., of or associated with the SMC), and/or a data store (e.g., of or associated with the SMC).

At 1102, signaling by communication devices associated with a base station can be monitored. The SMC can monitor the communication of signals, including control signals, by communication devices to the base station of a RAN (e.g., to a cell(s) of the base station).

At 1104, a group of signals, including control signals, communicated by the communication devices to the base station during a defined period of time can be analyzed. The SMC (e.g., employing the detector component) can analyze the group of signals, including control signals, communicated by the communication devices to the base station during the defined period of time.

At 1106, a determination can be made regarding whether a total amount of control signals received from the communication devices during the defined period of time satisfies a defined threshold total amount of control signals associated with the base station. The defined threshold total amount of control signals can relate to whether any communication device of the communication devices potentially is an excessive signaling device in accordance with defined communication management criteria. The detector component can classify respective base stations and/or respective cells of the respective base stations, including the base station, based at least in part on a result of analyzing information relating to respective activity levels of the respective base stations and/or respective cells, as more fully described herein. The activity levels of the respective base stations and/or respective cells can relate, at least in part, to respective amounts of signals, including control signals, that typically are received by the respective base stations and/or respective cells during various time periods (e.g., different times of day, different days of the week, different times of a year, different times associated with events (e.g., holidays, sporting events, entertainment events, or other type of events), different times in relation to events occurring in proximity to a base station or cell, or other types of time periods). For each base station or cell, as part of the classifying, the detector component can determine respective amounts of signals that can be considered usual activity of the base station or cell for respective time periods, and can determine respective defined threshold total amounts of control signals for respective time periods associated with a base station or cell, based at least in part on the respective amounts of signals that can be considered usual activity of the base station or cell for the respective time periods, in accordance with the defined communication management criteria. The respective defined threshold total amounts of control signals can comprise the defined threshold total amount of control signals associated with the base station for the defined period of time.

The detector component can determine whether the total amount of control signals received from the communication devices by the base station during the defined period of time satisfies the defined threshold total amount of control signals associated with the base station and applicable to the defined period of time based at least in part on the results of analyzing the signals, including the control signals, communicated by the communication devices to the base station during the defined period of time.

At 1108, in response to determining that the total amount of control signals received from the communication devices by the base station during the defined period of time does not satisfy the defined threshold total amount of control signals associated with the base station, a determination can be made that there is no indication that there is an excessive signaling communication device associated with the base station. In response to the detector component determining that the total amount of control signals received from the communication devices by the base station during the defined period of time does not satisfy (e.g., does not breach, or does not meet or exceed) the defined threshold total amount of control signals associated with the base station and applicable to that time period, the detector component can determine that there is no indication that there is an excessive signaling communication device associated with the base station, at least at that time. At this point, the method 1100 can proceed to reference numeral 1102 where signaling by the communication devices associated with the base station can continue to be monitored, and the method 1100 can proceed from that point.

If, instead, at reference numeral 1106, it is determined that the total amount of control signals received from the communication devices by the base station during the defined period of time satisfies the defined threshold total amount of control signals associated with the base station, at 1110, a determination can be made that there is an indication that there at least potentially can be an excessive signaling communication device associated with the base station. For instance, in response to the detector component determining that the total amount of control signals received from the communication devices by the base station during the defined period of time satisfies (e.g., breaches, or meets or exceeds) the defined threshold total amount of control signals associated with the base station, the detector component can determine that there is an indication that there at least potentially can be an excessive signaling communication device associated with the base station.

At 1112, information relating to respective communication conditions associated with respective communication devices associated with a base station can be obtained. The SMC can receive, obtain, or measure the respective communication conditions associated with the respective communication devices associated with the base station.

At 1114, the respective communication conditions associated with the respective communication devices can be determined based at least in part on the results of analyzing the information relating to the respective communication conditions. The detector component can determine the respective communication conditions associated with the respective communication devices based at least in part on the results of analyzing the information relating to the respective communication conditions.

At 1116, one or more communication devices can be identified based at least in part on the respective communication conditions associated with the respective communication devices. The detector component can identify (e.g., at least indirectly identify) one or more communication devices based at least in part on the results of analyzing the respective communication conditions (e.g., the information relating to the respective communication conditions) associated with the respective communication devices. For instance, the detector component can identify a first communication device that can have a first set of communication conditions (e.g., a first communication signature) and/or a second communication device that can have a second set of communication conditions (e.g., a second communication signature), based at least in part on the results of analyzing the respective communication conditions associated with the respective communication devices, comprising the first and second communication devices, wherein the first set of communication conditions can be distinguishable from the second set of communication conditions to enable distinguishing between and identifying the first communication device and the second communication device. At this point, the method 1100 can proceed to reference point A, as depicted in FIG. 11, wherein, as depicted in FIG. 12, the method 1100 can proceed from reference point A, as presented in FIG. 12 and described herein.

At 1118, with regard to the one or more communication devices, a number of control signals communicated by a communication device during the defined period of time can be determined based at least in part on the results of analyzing the group of signals received by the base station during the defined period of time and the set of communication conditions associated with the communication device.

With regard to each of the one or more communication devices, the detector component can determine the number of control signals communicated by the communication device during the defined period of time based at least in part on the results of analyzing the group of signals, including control signals, received by the base station during the defined period of time and the set of communication conditions associated with the communication device. For instance, with regard to each of the one or more communication devices, the detector component can determine a number of control signals associated with a set of communication conditions, which can be associated with a communication device to facilitate identifying the communication device.

At 1120, a determination can be made regarding whether any communication device associated with the base station has communicated a number of control signals to the base station that satisfies a defined threshold number of control signals based at least in part on the respective numbers of control signals communicated to the base station by respective communication devices during the defined period of time. With regard to each of the one or more communication devices, the detector component can determine whether any communication device has communicated a number of control signals to the base station during the defined period of time that satisfies (e.g., breaches, or meets or exceeds) a defined threshold number of control signals based at least in part on the respective numbers of control signals communicated to the base station by respective communication devices during the defined period of time. The defined threshold number of control signals can be determined based at least in part on the defined communication management criteria. In some embodiments, the defined threshold number of control signals can be the same with regard to all of the communication devices, when doing so is in accordance with the defined communication management criteria. In other embodiments, there can be different defined threshold numbers of control signals that can be applied to different types of communication devices, when doing so is in accordance with the defined communication management criteria. For example, if the detector component has received information that can identify a type of communication device, and that type of communication device is associated with a particular level or frequency of communication of control signals, there can be a particular defined threshold number of control signals that can be applicable to that type of communication device.

At 1122, in response to determining that no communication device satisfies the defined threshold number of control signals, it can be determined that no communication device is to be classified as an excessive signaling communication device at this time. If the detector component determines that no communication device satisfies the defined threshold number of control signals, the detector component can determine that no communication device is to be classified as an excessive signaling communication device at this time. At this point, the method 1100 can proceed to reference point B, as depicted in FIG. 12, wherein, as depicted in FIG. 11, the method 1100 can proceed from reference point B to reference numeral 1102 where signaling by the communication devices associated with the base station can continue to be monitored, and the method 1100 can proceed from that point.

Referring again to reference numeral 1120, if, instead, at 1120, it is determined that a communication device(s) satisfies the defined threshold number of control signals, at 1124, the communication device(s) can be classified as an excessive signaling communication device(s). If the detector component determines that the number of control signals communicated by a communication device(s) to the base station during the defined period of time satisfies the defined threshold number of control signals, the detector component can determine that the communication device(s) can be classified as an excessive signaling communication device(s).

At 1126, a set of statistics relating to the excessive signaling of the excessive signaling communication device(s) can be determined based at least in part on the results of analyzing the information relating to signaling by the communication devices, including the excessive signaling communication device(s), associated with the base station, information relating to the base station, and/or the information relating to the communication conditions associated with the communication devices. The detector component can determine the set of statistics (e.g., device identifier information, exception level statistics, trend statistics, periodic communication statistics, confidence level statistics, or other desired statistics) relating to the excessive signaling of the excessive signaling communication device(s) based at least in part on the results of analyzing the information relating to signaling by the communication devices associated with the base station, information relating to the base station, and/or the information relating to the communication conditions associated with the communication devices, as more fully described herein.

At 1130, the set of statistics relating to the excessive signaling of the excessive signaling communication device(s) can be presented. The detector component can present (e.g., communicate, display, or output) the set of statistics relating to the excessive signaling of the excessive signaling communication device(s) to a communication device, an interface component (e.g., display screen, audio speakers, or other desired interface), and/or a user.

Additionally or alternatively (e.g., optionally), at 1132, a mitigation action, which can be performed to mitigate the excessive signaling of the excessive signaling communication device(s), can be determined, in response to and based at least in part on the communication device(s) being classified as an excessive signaling communication device(s), for example, when performing the mitigation action is in accordance with the defined communication management criteria. In some embodiments, in addition to, or as an alternative to, determining the set of statistics, the SMC can determine a mitigation action to perform to mitigate (e.g., reduce or eliminate) the excessive signaling of the excessive signaling communication device(s), in response to and based at least in part on the communication device(s) being classified as an excessive signaling communication device(s), for example, when performing the mitigation action is in accordance with the defined communication management criteria. In certain embodiments, the SMC can decide whether to implement a mitigation action and/or what type of mitigation action to perform to mitigate the excessive signaling of the excessive signaling communication device(s) based at least in part on the results of analyzing the set of statistics relating to the excessive signaling of the excessive signaling communication device(s) and the defined communication management criteria, which can comprise the defined network security criteria. The types of mitigation action can comprise, for example, blocking communications or attempts to communicate by the excessive signaling communication device with the base station and/or other base stations, throttling (e.g., partially blocking at least some) communications or attempts to communicate by the excessive signaling communication with the base station and/or other base stations, disconnecting or blocking connection of the excessive signaling communication device with the base station and/or other base stations, send a message to the excessive signaling communication device to request or instruct such communication device to reduce the amount of signaling and/or change a parameter to reduce the amount of signaling, or another desired type of mitigation action.

At 1134, the mitigation action can be performed to mitigate the excessive signaling of the excessive signaling communication device(s). The SMC can perform or facilitate performing (e.g., instructing another component to perform) the mitigation action to mitigate the excessive signaling of the excessive signaling communication device(s).

Figure 13:
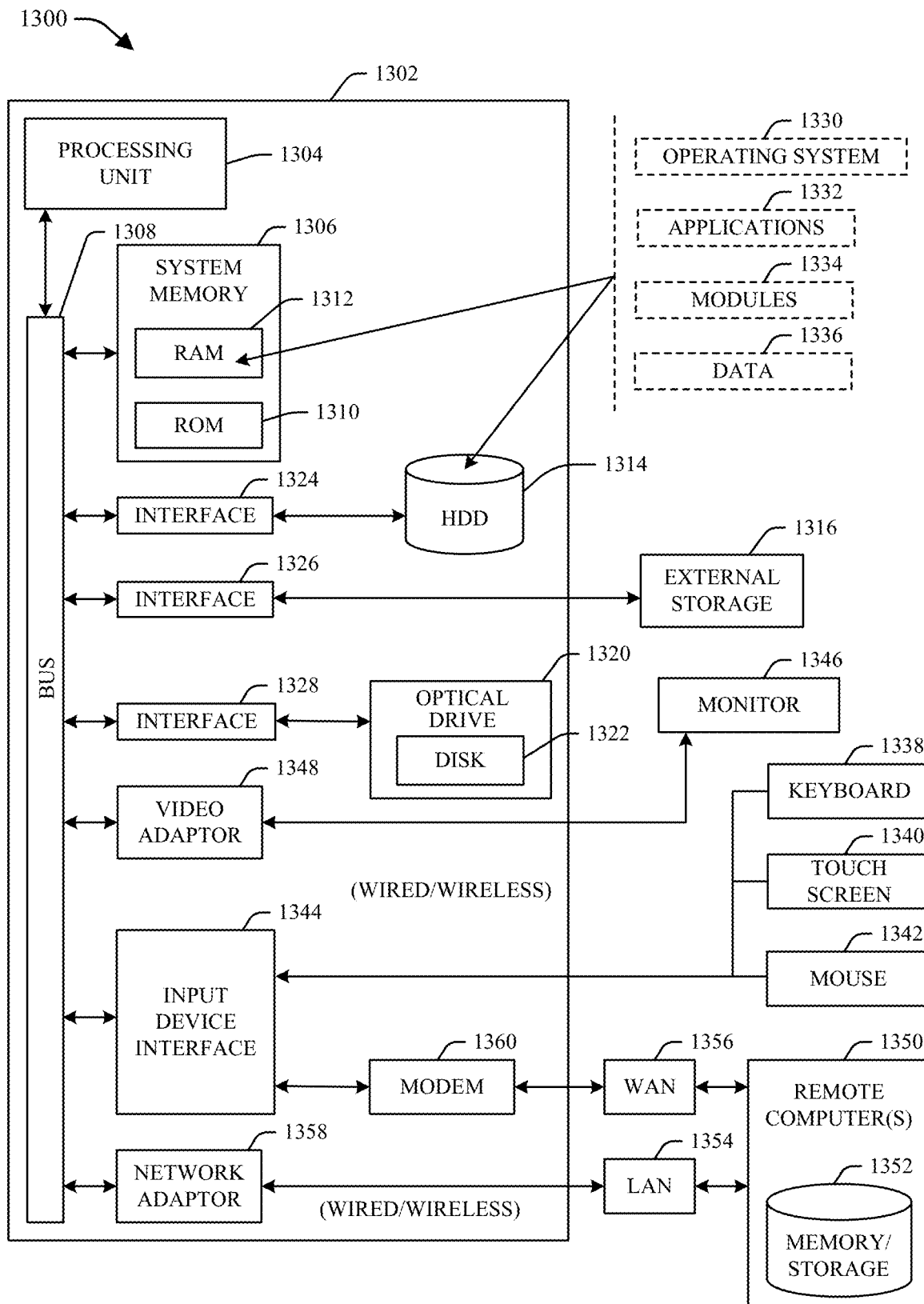
FIG. 13 is a schematic block diagram illustrating a suitable computing environment in which the various embodiments of the embodiments described herein can be implemented.

In order to provide additional context for various embodiments described herein, FIG. 13 and the following discussion are intended to provide a brief, general description of a suitable computing environment 1300 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH™ interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356, e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

It is to be noted that aspects, features, and/or advantages of the disclosed subject matter can be exploited in substantially any wireless telecommunication or radio technology, e.g., Wi-Fi; Gi-Fi; Hi-Fi; BLUETOOTH™; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); etc. Additionally, some or all of the aspects described herein can be exploited in legacy telecommunication technologies, e.g., GSM. In addition, mobile as well non-mobile networks (e.g., the internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication device, RAN, RIC, base station, communication network, security management component, detector component, connection manager component, machine learning component, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
identifying, by a system comprising a processor, a device associated with a base station based on communication conditions associated with the device;
obtaining, by the system, device type information associated with the device; and
determining, by the system, whether to classify the device as an excessive signaling device based on an amount of control signals determined to be received from the device by the base station, the device type information associated with the device, and a defined communication management criterion that relates to excessive signaling.

2. The method of claim 1, further comprising:
analyzing, by the system, a group of control signals received from devices, comprising the device, during a defined period of time, wherein the devices are associated with the base station; and
based on the analyzing, determining, by the system, whether a total amount of control signals of the group of control signals received from the devices during the defined period of time satisfies a defined threshold total amount of control signals associated with the base station, wherein the defined threshold total amount of control signals relates to whether any device of the devices potentially is the excessive signaling device in accordance with the defined communication management criterion.

3. The method of claim 2, further comprising:
in response to determining that the total amount of control signals of the group of control signals satisfies the defined threshold total amount of control signals associated with the base station:
identifying, by the system, at least one of the devices associated with the base station based on respective communication conditions associated with the at least one of the devices, wherein the identifying of the at least one of the devices comprises the identifying of the device; and
determining, by the system, whether any device of the devices satisfies a defined threshold amount of control signals that indicates the excessive signaling, in accordance with the defined communication management criterion.

4. The method of claim 1, further comprising:
receiving, by the system, information relating to connectivity and mobility events, signal power, and signal quality associated with the base station and devices associated with the base station over a specified time period, wherein the connectivity and mobility events comprise control signals associated with the devices;
analyzing, by the system, the information;
determining, by the system, a profile of the base station based on a result of the analyzing of the information; and
determining, by the system, a defined threshold amount of control signals that indicates the excessive signaling or a defined threshold total amount of control signals associated with the base station based on the profile.

5. The method of claim 1, further comprising:
in response to determining that the amount of control signals determined to be received from the device during a defined time period satisfies a defined threshold amount of control signals that indicates the excessive signaling, determining, by the system, that the device is to be classified as the excessive signaling device, wherein the defined threshold amount of control signals is determined in accordance with the defined communication management criterion.

6. The method of claim 5, wherein the defined communication management criterion is a first defined communication management criterion, and wherein the method further comprises:

in response to classifying the device as the excessive signaling device, determining, by the system, a mitigation action to perform to facilitate mitigating the excessive signaling associated with the device based on the amount of control signals determined to be received from the device and based on a second defined communication management criterion relating to excessive signaling mitigation.

7. The method of claim 6, further comprising:

performing, by the system, the mitigation action, wherein the performing of the mitigation action comprises:
logging information relating to the device;
communicating an alert message to a messaging account or an interface associated with a user identity, wherein the alert message presents information that relates to the excessive signaling by the excessive signaling device;
initiating a blocking of the device from connecting to or communicating via a group of base stations comprising the base station; or
initiating throttling of the device to block a portion of attempts by the device to connect to or communicate with the group of base stations.

8. The method of claim 7, further comprising:

to facilitate the blocking of the device, determining, by the system, a first range of signal quality values associated with the device, a second range of signal strength values associated with the device, or a third range of timing advance values associated with the device, based on an analysis of the communication conditions associated with the device,
wherein the initiating of the blocking of the device comprises initiating blocking of at least one of the devices that is determined to have a signal quality value within the first range of signal quality values, a signal strength value within the second range of signal strength values, or a timing advance value within the third range of timing advance values, and wherein the at least one of the devices comprises the device.

9. The method of claim 5, further comprising:

in response to classifying the device as the excessive signaling device, performing at least one of:
determining, by the system, an exception level associated with the device based on a defined threshold exception value, wherein the exception level indicates a criticality associated with the excessive signaling by the device;
determining, by the system, an exception trend associated with the device based on an analysis of information relating to communication of the control signals by the device, wherein the exception trend indicates
an upward trend, a downward trend, or an unknown trend in the communication of the control signals by the device, or
a stable condition regarding the communication of the control signals by the device;
determining, by the system, a statistic relating to periodic communication of the control signals by the device, wherein the statistic comprises an average amount of control signals communicated by the device over a specified time period or a variance in a frequency of the communication of the control signals by the device during the specified time period;
determining, by the system, respective start times and respective end times associated with the determining of the exception trend or the statistic; or
determining, by the system, a confidence level associated with the determination that the device is the excessive signaling device.

10. The method of claim 1, further comprising:

determining, by the system, a group of configuration parameters associated with the device, wherein the group of configuration parameters comprises a quality of service class identifier, an allocation and retention priority parameter, a mobility management entity or access management function code, a mobility management entity or access management function group identifier, or a band frequency associated with the device,
wherein the determining whether to classify the device as the excessive signaling device comprises determining whether to classify the device as the excessive signaling device based on the amount of control signals and the group of configuration parameters associated with the device.

11. The method of claim 1, further comprising:

determining, by the system, a group of configuration parameters associated with the device, wherein the group of configuration parameters comprises a quality of service class identifier, an allocation and retention priority parameter, a mobility management entity or access management function code, a mobility management entity or access management function group identifier, or a band frequency associated with the device,
wherein the identifying comprises identifying the device associated with the base station based on the communication conditions associated with the device and the group of configuration parameters associated with the device.

12. The method of claim 1, wherein the control signals comprise at least one of an attach request signal to request an attachment to the base station, an update attach request signal relating to the attachment to the base station, an authentication update request relating to the attachment to the base station, a packet data network gateway update request relating to the attachment to the base station, a connection request signal to request a connection to the base station, or a handover-related signal associated with a handover of the device to or from the base station.

13. The method of claim 1, further comprising:

determining, by the system, the communication conditions based on a received signal strength indicator value, a received signal received power value, a received signal received quality value, a channel quality indicator, a signal to interference and noise ratio value, or a timing advance value associated with the device.

14. A system, comprising:
a processor; and
a memory that stores executable instructions that, when executed by the processor, facilitate performance of operations, comprising:
identifying a user equipment associated with a base station based on communication conditions associated with the user equipment;
receiving user equipment type data indicative of a user equipment type of the user equipment; and
determining whether to classify the user equipment as aggressive signaling user equipment based on a number of control signals determined to be received from the user equipment by the base station, the user equipment type of the user equipment, and a defined communication management criterion that indicates what constitutes aggressive signaling.

15. The system of claim 14, wherein the operations further comprise:
evaluating a group of control signals received from a group of user equipment, comprising the user equipment, during a defined period of time, wherein the group of user equipment is associated with the base station; and
based on a result of the evaluating, determining whether a total number of control signals of the group of control signals received from the group of user equipment during the defined period of time satisfies a defined threshold total number of control signals associated with the base station, wherein the defined threshold total number of control signals relates to whether any user equipment of the group of user equipment potentially is the aggressive signaling user equipment.

16. The system of claim 15, wherein the operations further comprise:
in response to determining that the total number of control signals of the group of control signals satisfies the defined threshold total number of control signals associated with the base station:
identifying at least one user equipment of the group of user equipment based on respective communication conditions associated with the at least one user equipment, wherein the identifying of the at least one user equipment comprises the identifying of the user equipment; and
determining whether any user equipment of the group of user equipment satisfies a defined threshold number of control signals that indicates the aggressive signaling, in accordance with the defined communication management criterion.

17. The system of claim 14, wherein the operations further comprise:
in response to determining that the number of control signals determined to be received from the user equipment during a defined time period satisfies a defined threshold number of control signals that indicates the aggressive signaling, determining that the user equipment is to be classified as the aggressive signaling user equipment, wherein the defined threshold number of control signals is determined in accordance with the defined communication management criterion.

18. The system of claim 14, wherein the defined communication management criterion is a first defined communication management criterion, and wherein the operations further comprise:
in response to classifying the user equipment as the aggressive signaling user equipment:
determining a mitigation action to perform to facilitate mitigating the aggressive signaling associated with the user equipment based on the number of control signals determined to be received from the user equipment and based on a second defined communication management criterion relating to aggressive signaling mitigation; or
determining a group of statistics relating to the aggressive signaling associated with the user equipment or the base station, wherein the group of statistics relates to a trend in communication of the control signals, an exception level that indicates a criticality associated with the aggressive signaling associated with the user equipment or associated with the base station, an average number of control signals communicated by the user equipment over a specified time period, a variance in a frequency of the communication of the control signals by the user equipment during the specified time period, or a confidence level of the determination that the user equipment is the aggressive signaling user equipment.

19. A non-transitory machine-readable medium, comprising executable instructions that, when executed by a processor, facilitate performance of operations, comprising:
identifying a user equipment associated with network equipment based on communication conditions associated with the user equipment;
determining a group of configuration parameters associated with the user equipment; and
determining whether to classify the user equipment as excessive signaling user equipment based on an amount of signals determined to be received from the user equipment by the network equipment, the group of configuration parameters associated with the user equipment, and a defined threshold amount of signals that is indicative of excessive signaling.

20. The non-transitory machine-readable medium of claim 19, wherein the operations further comprise:
in response to determining that the amount of control signals determined to be received from the user equipment during a defined time period satisfies the defined threshold amount of control signals, determining that the user equipment is to be classified as the excessive signaling user equipment, wherein the defined threshold amount of control signals is determined in accordance with a first defined communication management criterion; and
in response to classifying the user equipment as the excessive signaling user equipment:
determining a mitigation action to perform to facilitate mitigating the excessive signaling associated with the user equipment based on the amount of control signals determined to be received from the user equipment and based on a second defined communication management criterion relating to excessive signaling mitigation, or
determining a group of statistics relating to the excessive signaling associated with the user equipment or the network equipment, wherein the group of statistics relate to a trend in communication of the control signals, an exception level that indicates a criticality associated with the excessive signaling associated with the user equipment or associated with the network equipment, an average amount of control signals communicated by the user equipment over a specified time period, a variance in a frequency of the communication of the control signals by the user equipment during the specified time period, or a confidence level associated with the determination that the user equipment is the excessive signaling user equipment.

\* \* \* \* \*